US007698817B2

(12) United States Patent
Khambete et al.

(10) Patent No.: US 7,698,817 B2
(45) Date of Patent: *Apr. 20, 2010

(54) METHODS OF FORMING VEHICLE INTERIOR COMPONENTS WHICH INCLUDE A DECOUPLER LAYER

(75) Inventors: Surendra Khambete, West Bloomfield, MI (US); William Griffin, Indian Trial, NC (US); Fred Skidmore, Marion, NC (US); Sandip Mehta, Canton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 963 days.

This patent is subject to a terminal disclaimer.

(21) Appl. No.: 11/224,696

(22) Filed: Sep. 12, 2005

(65) Prior Publication Data

US 2006/0208378 A1    Sep. 21, 2006

Related U.S. Application Data

(63) Continuation of application No. PCT/US2004/007957, filed on Mar. 12, 2004.

(60) Provisional application No. 60/454,203, filed on Mar. 12, 2003.

(51) Int. Cl.
*B21D 53/88* (2006.01)

(52) U.S. Cl. ............... 29/897.2; 29/527.1; 264/46.8; 264/250; 264/263; 264/275; 264/294; 425/508; 428/218

(58) Field of Classification Search ............... 29/897.2, 29/527.1; 264/250, 263, 275, 294, 322, 46.8, 264/119; 428/174, 218; 425/508
See application file for complete search history.

(56) References Cited

U.S. PATENT DOCUMENTS 2,702,261 A    2/1955    Bacon et al.

(Continued)

FOREIGN PATENT DOCUMENTS

| DE | 2006741 B2 | 3/1974 |
| EP | 0606184 A1 | 7/1994 |
| JP | 58183330 | 10/1983 |
| WO | 9112944 | 9/1991 |
| WO | 02095111 A1 | 11/2002 |

OTHER PUBLICATIONS

International Search Report; date of mailing Oct. 22, 2004; issued in International Application No. PCT/US04/07024.

(Continued)

*Primary Examiner*—Rick K Chang
(74) *Attorney, Agent, or Firm*—Grossman, Tucker, Perreault & Pfleger, PLLC

(57) ABSTRACT

A method of manufacturing an article such as vehicle interior trim component including a decoupler layer is disclosed. The method comprises the conveying of materials into an enclosure to form a preform having a shape of the enclosure, heating the preform to a temperature such that adjacent materials may bond to one another upon cooling and forming the heated preform into a predetermined three-dimensional decoupler configuration via a mold. The enclosure has a perforated portion and at least one panel movable relative to the enclosure so as to selectively expose portions of the perforated portion. The density of the preform may be varied as the at least one panel is moved to expose the perforated portion of the enclosure. A system for manufacturing articles such as a vehicle interior trim component including a decoupler layer is also disclosed.

33 Claims, 19 Drawing Sheets

U.S. PATENT DOCUMENTS

| | | | |
|---|---|---|---|
| 3,054,714 A | 9/1962 | Johnston | |
| 3,673,034 A | 6/1972 | Squier | |
| 4,131,664 A | 12/1978 | Flowers et al. | |
| 4,385,955 A | 5/1983 | Doerfling et al. | |
| 4,421,468 A | 12/1983 | Bokelmann | |
| 4,529,639 A | 7/1985 | Peoples, Jr. et al. | |
| 4,568,581 A | 2/1986 | Peoples, Jr. | |
| 4,579,764 A | 4/1986 | Peoples, Jr. et al. | |
| 4,663,103 A | 5/1987 | McCullough et al. | |
| 4,687,612 A * | 8/1987 | Clarke et al. | 264/322 |
| 4,772,443 A | 9/1988 | Thornton et al. | |
| 4,808,545 A | 2/1989 | Balasubramanyam et al. | |
| 4,824,709 A | 4/1989 | Tschirch | |
| 4,849,267 A | 7/1989 | Ward et al. | |
| 4,877,669 A | 10/1989 | Endrenyi, Jr. et al. | |
| 4,890,995 A | 1/1990 | Gray | |
| 4,898,697 A | 2/1990 | Horton | |
| RE33,200 E | 4/1990 | Reynolds et al. | |
| 4,988,551 A | 1/1991 | Zegler | |
| 5,068,001 A | 11/1991 | Haussling | |
| 5,147,653 A | 9/1992 | Nelson | |
| 5,215,696 A | 6/1993 | Weibel et al. | |
| 5,217,672 A | 6/1993 | Kelman et al. | |
| 5,229,052 A | 7/1993 | Billiu | |
| 5,302,445 A | 4/1994 | DePetris et al. | |
| 5,328,494 A | 7/1994 | Kelman et al. | |
| 5,336,455 A | 8/1994 | Kelman | |
| 5,413,750 A | 5/1995 | Kelman et al. | |
| 5,482,665 A | 1/1996 | Gill | |
| 5,483,028 A | 1/1996 | Holwerda | |
| 5,492,662 A | 2/1996 | Kargol et al. | |
| 5,536,341 A | 7/1996 | Kelman | |
| 5,536,556 A | 7/1996 | Juriga | |
| 5,538,581 A | 7/1996 | Gallant | |
| 5,656,109 A | 8/1997 | Schilling et al. | |
| 5,681,519 A | 10/1997 | Kelman | |
| 5,733,631 A | 3/1998 | Kelman | |
| 5,749,993 A | 5/1998 | Denney et al. | |
| 5,780,156 A | 7/1998 | Hoyt et al. | |
| 5,843,365 A | 12/1998 | Pinson et al. | |
| 5,876,826 A | 3/1999 | Hoffmann et al. | |
| 5,935,509 A | 8/1999 | Elliott | |
| 6,024,190 A | 2/2000 | Ritzema | |
| 6,033,501 A | 3/2000 | Yamaguchi et al. | |
| 6,033,607 A | 3/2000 | Kataoka et al. | |
| 6,096,249 A | 8/2000 | Yamaguchi | |
| 6,127,021 A | 10/2000 | Kelman | |
| 6,162,748 A | 12/2000 | Schilling et al. | |
| 6,165,921 A | 12/2000 | Nagata et al. | |
| 6,183,038 B1 | 2/2001 | Hansen et al. | |
| 6,210,147 B1 | 4/2001 | Mori et al. | |
| 6,264,454 B1 | 7/2001 | Hale | |
| 6,305,920 B1 | 10/2001 | Kean et al. | |
| 6,318,796 B1 | 11/2001 | Felsen | |
| 6,345,688 B1 | 2/2002 | Veen et al. | |
| 6,382,350 B1 | 5/2002 | Jezewski et al. | |
| 6,406,574 B1 | 6/2002 | Hammel et al. | |
| 6,534,145 B1 | 3/2003 | Boyles | |
| 6,548,141 B2 | 4/2003 | Nagata et al. | |
| 6,578,447 B1 | 6/2003 | Fraser | |
| 6,595,321 B1 | 7/2003 | Tompson | |
| 6,616,789 B2 | 9/2003 | Price et al. | |
| 6,629,340 B1 | 10/2003 | Dale et al. | |
| 6,631,785 B2 | 10/2003 | Khambete et al. | |
| 6,648,100 B2 | 11/2003 | Ebbitt | |
| 6,659,223 B2 | 12/2003 | Allison et al. | |
| 6,683,563 B2 | 1/2004 | Lee et al. | |
| 6,710,133 B2 | 3/2004 | Gebreselassie et al. | |
| 6,736,442 B2 | 5/2004 | Gebreselassie et al. | |
| 6,802,389 B2 | 10/2004 | Tompson et al. | |
| 6,821,366 B2 * | 11/2004 | Allison et al. | 156/72 |
| 7,055,649 B2 | 6/2006 | Tompson et al. | |
| 7,063,183 B2 | 6/2006 | Allison et al. | |
| 7,320,739 B2 | 1/2008 | Thompson, Jr. et al. | |
| 2002/0160682 A1 | 10/2002 | Zeng et al. | |
| 2003/0096079 A1 | 5/2003 | Messina et al. | |
| 2005/0023080 A1 | 2/2005 | Tompson et al. | |
| 2006/0208379 A1 * | 9/2006 | Khambete et al. | 264/46.8 |

OTHER PUBLICATIONS

International Search Report; date of mailing Mar. 10, 2006; issued in International Application No. PCT/US04/07574.
International Search Report; date of mailing Mar. 31, 2005; issued in International Application No. PCT/US04/07575.
International Search Report; date of mailing Jun. 30, 2005; issued in International Application No. PCT/US04/07957.
Interior Noise Reduction by Brent Haight; Automotive Industries Jul. 2003; pp. 38-41.
Sound Power And Vector Sound Intensity by Daniel A. Russell; Science and Mathematics Dept., GMI Engineering & Management Institute; pp. 1-5.
ASTM International Designation: C 634-02; Standard Terminology Relating to Environmental Acoustics; pp. 1-7.
NPC Library; Noise Control Terms Made Somewhat Easier by David Kelso and Al Perez; Noise Pollution Clearinghouse; http://www.nonoise.org/library/diction/soundict.htm; Jan. 22, 2004; pp. 1-14.
TWL: Sound Insulation; pgslo@juno.com; Sun Oct. 15, 2000 (2 pgs); reprint from May 1996 issue of Waterfront New Northwest "Insulation Isn't All The Same" by Ron Reisner.

* cited by examiner

METHODS OF FORMING VEHICLE INTERIOR COMPONENTS WHICH INCLUDE A DECOUPLER LAYER

CROSS REFERENCE TO RELATED APPLICATIONS

This application is a Continuation of International Application No. PCT/US04/007957 filed Mar. 12, 2004, and published Sep. 23, 2004 as International Publication No. WO 2004/080710, designating the United States, and which claims priority to U.S. patent application Ser. No. 10/775,548 filed Feb. 10, 2004 (now abandoned) and claims the benefit of U.S. Provisional Application Ser. No. 60/454,203 filed Mar. 12, 2003, the teachings of which are incorporated by reference.

TECHNICAL FIELD

The present invention relates generally to interior trim components for vehicles, and more particularly to noise attenuation in vehicles achieved through the inclusion of a decoupler layer with an interior trim component.

BACKGROUND OF THE INVENTION

It is generally considered desirable to reduce the level of noise within a vehicle passenger compartment. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in the dashboard, in conjunction with carpeting for floor panels, in the wheel wells, in the trunk compartment, under the hood, and as part of the headliner.

Recently, a lot of emphasis has been placed on the acoustic properties of vehicle trim components, such as carpeting and dash insulators, because of customer requirements for quieter passenger compartments. Carpeting used to cover the floor areas of vehicles, such as automobiles, is conventionally molded into a non-planar three dimensional contoured configuration which conforms to the contours of the vehicle floor so as to fit properly. Dash insulators are mounted to a vehicle firewall which separates the passenger compartment from an engine compartment. Dash insulators are designed to reduce the transmission of noise and heat from the engine compartment into the passenger compartment. Package trays and trunk trim may be used to reduce the noise entering the passenger area of a vehicle.

A foam or fibrous layer of material referred to as a decoupler is typically attached to the backside of vehicle dash insulators and carpeting to assist in the sound attenuation. The decoupler may act as an isolator between adjoining layers. The decoupler and interior trim component are usually supplied for installation into the vehicle separately, but preferably as described herein, should be combined during manufacturing so that a single product may be installed in the vehicle, saving labor and transportation costs. Decouplers may be required to have complex shapes and configurations and, as such, may be time-consuming and expensive to manufacture. Vehicle manufacturers are constantly looking for ways to reduce costs and complexity associated with vehicle manufacturing. Moreover, vehicle manufacturers are constantly looking for ways to reduce noise within passenger compartments while reducing weight of trim components. Accordingly, there is a need for acoustical insulation materials for use within vehicles that exhibit superior sound attenuating properties, while also being lightweight, low in cost and easy to install.

SUMMARY OF THE INVENTION

In view of the above, systems and methods of forming articles of controlled density, such as interior trim components including a decoupler layer, are provided. According to embodiments of the present invention, a method of manufacturing a vehicle interior trim component including a decoupler layer includes: ascertaining the acoustic properties of a portion of a vehicle passenger compartment against which an interior trim component may be placed to identify portions thereof requiring enhanced sound attenuation; conveying material into an enclosure to form a preform having a desired shape and density profile; heating the preform to a temperature such that upon cooling adjacent materials may bond to one another; heating an interior trim component to a second temperature; mating the preform and interior trim component together; and forming the heated combination into a predetermined three-dimensional interior trim product configuration, including a decoupler layer, via a mold. The predetermined configuration is based upon the physical dimensions of the vehicle in the area where the interior trim component will be installed and the sound attenuation desired in that area.

According to embodiments of the present invention, an enclosure into which materials are conveyed has a perforated portion and one or more panels are movable relative to the enclosure so as to selectively expose portions of the perforated portion as materials are conveyed via an airstream into the enclosure to form a preform. The air exits the enclosure through the perforated portion and allows the loose materials to collect in that area of the enclosure. The density of selected areas of the preform formed within the enclosure is controlled by the rate and/or duration at which the perforated portion of the enclosure is exposed. The density also may be a function of the pressure in the air stream which conveys the loose material and the concentration of the material in the air stream. According to embodiments of the present invention, the density of selected areas of the preform may be increased in areas identified as requiring enhanced sound attenuation. Thus, for each selected area of an interior trim component identified as requiring enhanced sound attenuation, pressure may be increased along with the concentration of materials conveyed, and/or the rate of movement of the panel is slowed, and/or the duration of exposure of the perforated portion is increased, so that more materials are conveyed into that particular area of the enclosure and collected to form a preform. In addition, a preform of varying cross section that is contoured may be formed and later compressed to provide additional densification and sound attenuation in specific areas.

Furthermore, the delivery of material may be adjusted by controlling the opening diameter of the output section of the duct that provides the airflow to the enclosure, and such airflow may also be selectively pulsed or varied in rate to again control the amount of material collecting at a given location in the enclosure.

According to embodiments of the present invention, the interior trim component (carpet, dash insulator, package tray, trunk trim, etc.) may be supplied in individual (e.g. sheet) or continuous form (roll, etc.) to the heating apparatus and, as required, heated, either individually or in combination with the preform, to prepare both components for forming and bonding.

According to embodiments of the present invention, a method of manufacturing an article having a controlled density, preferably a preform or decoupler, includes filling an enclosure with material, e.g. thermoplastic material, thermoset material, fibrous material, foam, woven material, non-woven material, fibers of any type, and combinations thereof. Preferably, blends of fibers may be utilized. For example, different denier fibers may be used at different locations to achieve different acoustical performance. In addition, fibers of different material compositions may be used, as well as fibers having multiple material compositions within the same fiber (for instance, bicomponent fibers such as sheath/core, alternating segments, etc.) and blends thereof.

Reference to the conveying of "material" or "materials" should be understood to include the conveying of a single material, for instance in fiber form, or two or more materials either in fiber form or non-fibrous form. Furthermore, the materials used to fill the enclosure may be in nearly any form and shape, including but not limited to, fibers, clumps, chunks, tufts, beads, clusters, scraps, powder and pellets. The materials may also be of nearly any size and aspect ratio. In addition, it is preferred to control such size and aspect ratio such that may be conveyed to the enclosure and retained in the enclosure and to preferably provide an article with some degree of loft or reduced density.

Accordingly, the size and shape of the openings in the perforated portion of the enclosure may be selectively adjusted such that the materials having a variety of forms and shapes that are conveyed to the enclosure may be collected in the enclosure to form a preform.

Interior trim components, including a decoupler layer, according to embodiments of the present invention may be manufactured inexpensively and may replace expensive preformed batting, multiple layers of materials and other fibrous materials currently utilized in vehicles. Moreover, the decoupler layer, according to the present invention, may utilize less material than conventional batting because material for sound absorption is strategically placed directly where it is needed providing a more efficient use of material. Thus, the combination of specific area density and localized part thickness are used to provide effective sound attenuation by selectively controlling density and thickness at any selected location. As such, interior trim components including a decoupler layer according to the present invention may be lighter in weight when compared with conventional interior trim components and separate decouplers and may be provided with variable thickness without the stacking of multiple layers. Interior trim components including a decoupler layer according to embodiments of the present invention may have different acoustical profiles in different locations to suit the specific needs of a vehicle. The interior trim components disclosed herein therefore provide the opportunity to control costs by targeting decoupler material, preferably fiber, placement at selected locations while avoiding the need for more expensive components such as binder layers or other additives or multiple layers in the overall interior trim composition. In addition, it should be understood in the context of the present invention, and with respect to functionality, reference to a decoupler includes any media which acts as a sound absorber or sound barrier or sound isolator or sound insulator or sound attenuator, or combinations thereof. Accordingly a decoupler includes any media that may effect sound.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
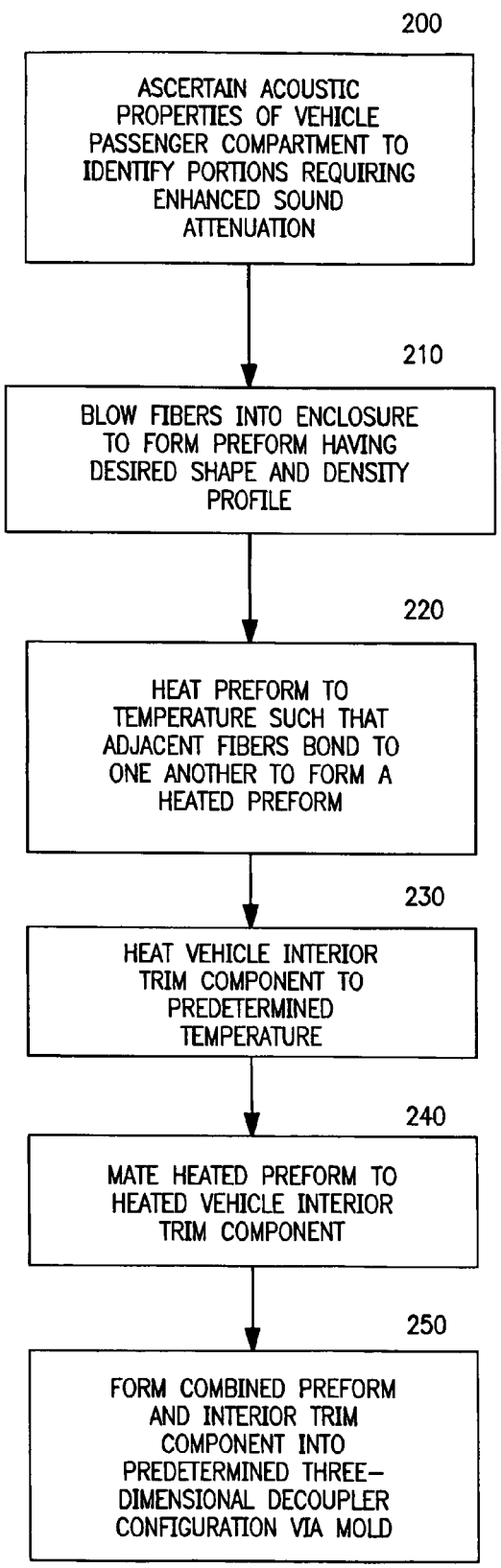
FIG. 1 is a flow chart of operations illustrating the method of manufacturing an interior trim component, including a decoupler layer, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 10A, 10B, and so forth in subsequent embodiments. Thus, where an embodiment description uses a reference character to refer to an element, the reference character applies equally, as distinguished be alphanumeric character, to the other embodiments where the element is common.

Referring now to FIG. 1, a method of manufacturing a vehicle interior trim component, including a decoupler layer, according to embodiments of the present invention, includes the steps of: ascertaining the acoustic properties of a portion of a vehicle passenger compartment against which an interior trim component is to be placed to identify portions thereof requiring enhanced sound attenuation (Block 200); blowing materials, preferably fibers, into an enclosure to form a preform having a desired shape and density profile (Block 210); heating the preform to a temperature such that adjacent materials upon cooling may bond to one another (Block 220); heating an interior trim component (e.g. carpeting, dash insulator, etc.) to a predetermined temperature (Block 230); mating the heated preform and heated interior trim component together (Block 240); and forming the combined interior trim component and preform into a predetermined three-dimensional product configuration via a mold (Block 250). Upon cooling of the three-dimensional interior trim product configuration, the bonding of adjacent materials, preferably fibers, to one another in the decoupler layer provides shape retention of the predetermined configuration.

As noted, the present invention relies in part upon the step of heating the preform to a temperature such that upon cooling adjacent material, or the preferred fibers, bond to one another. This may be accomplished by a variety of methods, one of which is heating the materials or fibers to a temperature such that adjacent materials or fibers bond to one another without melting. Elaborating on this concept, it can be appreciated that this is in reference to the feature of employing an amorphous polymer, as part of the material or fiber mix, wherein the amorphous polymer itself does not have a defined melting point (Tm) sufficient to soften as a consequence of a true thermodynamic melting event, and provide bonding. Instead, since the polymer is amorphous, the softening may occur at a secondary transition temperature, e.g. the glass transition temperature (Tg), or at some other temperature. Those of skill in the art will therefore appreciate that heating of, for instance, fibers to a temperature such that the adjacent fibers bond to one another without melting may occur at a temperature above the Tg of a substantially amorphous polymer material within the fiber composition. Under such circumstances, the crystalline polymer fibers of the fiber mix remain non-melted, and the amorphous polymers heated at or above their Tg will provide the bonding necessary upon cooling.

Alternatively, it is contemplated that bonding may occur via the use of binders which themselves may be chemically reactive due to the introduction of heat. For example, one may optionally employ a binder system that includes a component, such as a polymeric precursor, which undergoes chemical crosslinking, as in the case of a thermoset type precursor. Alternatively, one may optionally elect to use a moisture cure system, wherein the component, such as a polymer resin, will, upon introduction of heat and moisture, react and solidify upon cooling to provide binding within the preform.

Furthermore, one may also use a non-reacting binder system, e.g., a urethane water dispersion which can be used to coat a material or fiber and which upon heating and evaporation of the water provides bonding of adjacent materials or fibers to form a preform. Again, this would be another example of material or fiber bonding without the material or fibers themselves melting.

In even further embodiment, one could also utilize a component binder, such as a polymer, with a melting point below the melting point of the material or fibers of the preform, which polymer binder would experience melting at elevated temperature to cause bonding of adjacent material or fibers within the preform when cooled. Again, this would be yet another example of material or fiber bonding without the material or fibers of the preform themselves melting.

It can therefore now be noted that the acoustic properties of a portion of a vehicle passenger compartment may be ascertained by identifying areas of the passenger compartment against which an interior trim component is to be placed where internal and external sounds have an intensity level that exceeds a threshold intensity level. This may include generating a sound intensity map of one or more portions of the passenger compartment. Sound intensity maps are well understood by those skilled in the art and need not be described further herein. For example, see "Noise Control: Measurement, Analysis and Control of Sound & Vibration", Krieger Publishing Co., Malabar, Fla., 1994.

According to embodiments of the present invention, the various steps of the operations illustrated in FIG. 1 may be performed out of the illustrated order. For example, acoustic properties of one or more portions of a vehicle passenger compartment may be performed well in advance of the remaining steps of FIG. 1. Furthermore, operations represented by various blocks may be performed substantially simultaneously. For example, a preform and an interior trim component may be heated (Blocks 220, 230) at substantially the same or different times.

According to embodiments of the present invention, an enclosure into which materials or fibers are conveyed has a perforated portion and one or more panels that are moveable relative to the enclosure in any direction so as to selectively expose portions of the perforated portion as materials or fibers are conveyed into the enclosure. The air steam, or for that matter, any other suitable carrying media such as a gas or fluid conveying the materials or fibers, exits the enclosure through the perforated portion, allowing the materials or fibers to collect in that area. In such regard, it should be appreciated that one could also simply gravity feed the enclosure with the materials or fibers. For exemplary purposes only, air will be relied upon as a preferred media for conveying the preferred fibers.

Fiber or material density of a preform formed within the enclosure may therefore be preferably controlled by the rate at which the perforated portion of the enclosure is exposed (or that the panels are moved) and/or the duration for which the perforated portions are exposed. For example, an essentially uniform rate of panel movement exposing the perforated portion will provide a preform of essentially uniform density. Slowing or increasing the rate of removal of the panels allows the preform to be comprised of various sections having higher and/or lower material or fiber density. In addition, the rate at which materials or the preferred fibers may be fed to the enclosure from the blower also may affect the density of the preform. For example, should one introduce fibers at a relatively high rate (e.g. 40 lbs./min.) for a relatively long time, over a given perforation area, such would provide a more dense packing of fibers relative to a slower rate of fiber introduction (e.g. 10 lbs./min.) for a shorter period of time.

According to embodiments of the present invention, material or the preferred fiber density may be increased in areas of a decoupler layer identified as requiring enhanced sound attenuation. Thus, for each area of a decoupler layer identified as requiring enhanced sound attenuation, the pressure in the enclosure is increased (or the rate of panel movement is decreased) as materials or fibers are blown into that particular area of the enclosure as the preform is being formed. Moreover, different types, sizes, composition and physical features of materials or fibers may be used at different locations of a decoupler layer. For example, it is contemplated that the feed mix of materials or fibers can be selectively adjusted at any given time during fill of the enclosure to vary the type of material or fiber delivered at a selected location within the enclosure. For example, the more dense the selected areas of the decoupler layer are formed, and the finer the fibers, the higher the acoustic impedance. Furthermore, in the broad context of the present invention, the preform may be of contoured shape and compressed at selective levels during molding to further control and densify specific areas.

Preferably, fibers as the preferred material are conveyed into the enclosure by supplying loose fibers to an air steam emanating from an air blower. However, other means for conveying the fibers or other materials, including but not limited to, vacuum and combinations of vacuum and pressure may be used. Accordingly, it can also be appreciated that for a given three dimensional contoured shape, vacuum may be selectively applied at those locations for which fiber fill needs to be assisted beyond mere filling via air blowing. More specifically, for areas of a preform that are desirably of a higher density and greater thickness, one may prefer to utilize air pressure and vacuum to improve fiber fill.

Material or the preferred fibers may be blown and/or drawn into the enclosure from more than one direction. For example, fibers may be blown into the enclosure from multiple directions and/or from multiple ducts or nozzles. In addition, it is further contemplated that various types of fibers may be conveyed into the enclosure selectively (e.g. specific fiber types supplied at each nozzle) through these ducts or nozzles to provide different preform compositions in selected areas of the preform. Further, specific nozzles or ducts may be selected at advantageous locations around the enclosure to deliver specific binder compositions of the types noted previously (e.g. amorphous fibers, reactive binders, low melting polymers, etc.).

As noted, various types and sizes of the preferred fibers may be utilized in accordance with embodiments of the present invention. For example, shoddy fibers may be utilized, as well as other scrap and non-scrap fibers of various lengths. Shoddy, being a mixture of various fibers, presents a unique opportunity to bond adjacent fibers together due to the varied properties of the fibers within the mixture. Preferably, as noted, the fibers are blown into the enclosure in a substantially loose state. The fibers may include, but are not limited to, synthetic fibers (thermoplastic and/or thermoset), natural fibers, recycled fibers and blends thereof. In addition, fibers having multiple compositions such as bicomponent fibers, including but not limited to, sheath/core, side-by-side, tipped, segmented pie, striped and islands-in-a-sea variants may be used, either alone, or in combination with synthetic and/or natural fibers may be used. In the case of bicomponent fibers, as alluded above, one of the components is strategically utilized to provide bonding after a heating and cooling profile. In addition, such bonding may occur without melting of the fibers of the preform, as the bicomponent may contain one polymer component that is amorphous and which does not have a Tm. Preferably, such bicomponent fiber comprises a sheath/core construction, with an inner core of crystalline poly(ethylene terphthalate) (PET) with a Tm of about 220° C. The sheath may comprise an amorphous polyester, with a Tg of about 70° C. Accordingly, the amorphous polyester may provide bonding when the system is heated above the Tg, and the other fibers do not themselves experience melting.

According to embodiments of the present invention, a carrier may be disposed within the enclosure and the material or preferred fibers blown into the enclosure to form a preform which is supported by the carrier. The carrier facilitates transporting the preform between the enclosure, the oven, and the mold. The carrier may be any of various types of materials. For example, the carrier may comprise an acoustic web of material. However, other types of materials that may be utilized as a carrier include, but are not limited to, scrim material, skin material, leather, plastic trim pieces, carpeting, shoddy, fiber batting, foam, etc. Preferably, the carrier may be an interior trim component such as carpeting. With respect to the carpeting, such carpeting is preferably porous, and includes a porous backing film, the film comprising a polyolefin polymer, and preferably, a polyethylene based material. In this manner, the preform is built up on the porous film layer of the carpeting. During heating of the preform and carpet, the film layer then serves to bond the preform to the carpet material. In addition, the carrier may also be a continuous (endless) belt which provides for support of the preferred fibers during a continuous manufacturing process, which belt then does not become part of the decoupler layer. Alternatively, the carrier may be a disposable film or sheet which is discarded when the interior trim component and preform are mated together.

Figure 2:
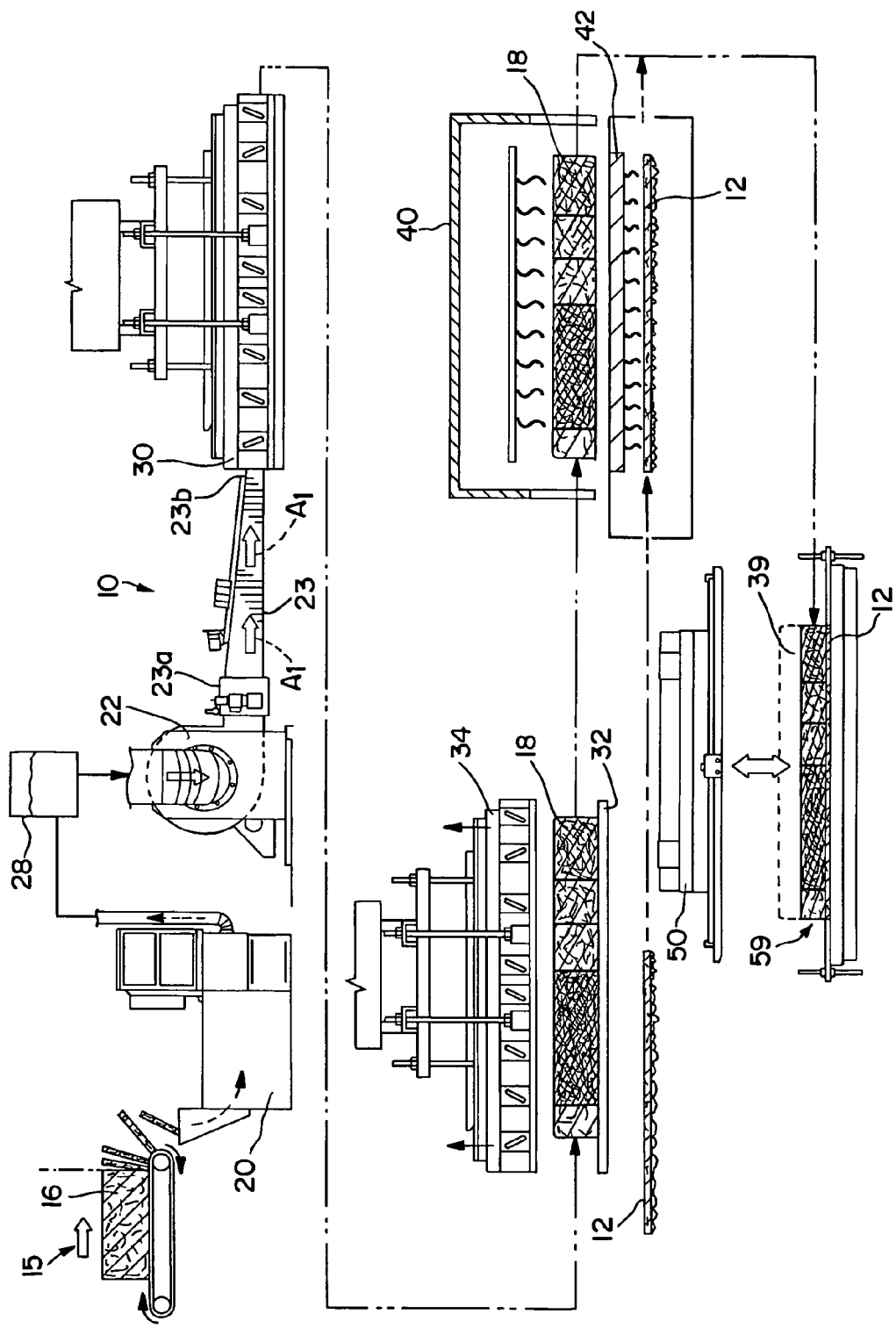
FIG. 2 is a schematic illustration of a system for manufacturing interior trim components, including a decoupler layer, according to embodiments of the present invention.

Referring now to FIG. 2, one preferred system 10 for manufacturing interior trim components including a decoupler layer, according to embodiments of the present invention, is illustrated. The illustrated system 10 includes a fiber bale breaking station 15 where bales of fiber 16 are broken into smaller sections and then loaded into a fiber preparation station 20. Fiber preparation station 20 is configured to release the fibers from a generally compressed configuration (caused by being bundled) to an open, loose configuration and then to supply the loose fibers to a blower 22. Various types of devices may be utilized to implement the function of the fiber preparation station 20. For example, sets of rotating teeth or spikes may be utilized to open the fibers, as would be understood by those skilled in the art. One or more centrifugal (or other types) of fans may be provided to supply the open fibers to blower 22 or an equivalent movement source.

In connection with this step of the process (debating) it may be preferred to include a controlled amount of moisture, via misting, and/or an antistat and/or the use of deionized air to aid in preventing the fibers from reverting to a compacted state prior to introduction into the enclosure. An accumulator 28 may preferably be utilized to feed the blower 22. The accumulator may preferably include a photoelectric detector to control the amount of fibers remaining in the accumulator for introduction into the enclosure.

Blower 22 is configured to blow the loose fibers into an enclosure 30 to form a preform 18 having the shape of the enclosure. In the illustrated embodiment, blower 22 and enclosure 30 are in fluid communication via duct 23. Flow of fibers through the duct 23 and into the enclosure 30 via the airstream is indicated by arrows $A_1$. Optionally, the air stream itself may be heated or cooled as desired.

As will be described below, the enclosure 30 has a perforated portion (38, FIG. 6) and one or more panels (35, FIG. 6) that are moveable relative to the enclosure so as to selectively expose portions of the perforated portion, and thereby control the preform density by allowing air to flow out of the enclosure through the exposed perforated portion causing more material or the preferred fibers to collect in an area as the pressure in that area increases. The illustrated enclosure 30 is defined by a base 32 and a movable upper portion 34. Accordingly it should be appreciated that in the context of the present invention, the feature of employing an enclosure corresponds to any structure that allows for collection of the fibers such that the fibers can assume the configuration of such enclosure. Therefore, it does not necessarily require walls on all sides.

The illustrated system 10 also includes an oven 40 and mold 50. The oven 40 heats (e.g., via heated air, infrared radiation, etc.) the preform 18 (after being removed from the enclosure 30) to a temperature such that adjacent materials or fibers upon cooling may bond to one another. As noted above, this is preferably accomplished by use of an amorphous polymer component that itself does not have a Tm. In addition, preferably, during heating in the oven, the preform may be initially reduced in thickness, at a level of between 1-75%, and at any increment therebetween. In a most preferred embodiment, the thickness of the preform may be reduced about 40-60% across its entire cross-section.

For example, in a preferred embodiment, a shoddy fiber blend was prepared with 55 wt. % cotton/polyester mix combined with 45 wt. % bicomponent sheath/core PET, where the sheath comprises an amorphous polyester and the core comprises a crystalline PET fiber component. The temperature required to allow such fiber blend to bond was about 390° F. However, it can be appreciated that various temperatures will be required for various different types of fibers.

Preferably, at about the same time, an interior trim component such as carpeting 12 may be supplied to an oven 40 and heated by the same or an alternate heating source. Preferably, the carpet is heated on the backside by infrared heaters 42. An interior trim component such as carpeting may preferably have a backing layer that may be either porous or non-porous that will contact the preform when the carpet and preform are mated together. Various temperatures may be required to provide the shape retentive properties for the various different types of materials or fibers in the preform and in the carpet, and a second temperature may be required for the carpet such that upon mating the two materials and forming them to shape in the mold 50, the preform 18 and carpet 12 become bonded.

After being removed from the oven 40, the heated carpet 12 and heated preform 18 are mated together and supplied to a mold 50 which forms the combination into a predetermined three-dimensional interior trim component configuration (including a decoupler layer 39) by closing the mold 50 over the combined carpet 12 and preform 18 and compressing them to the desired shape and density. Upon removal from the mold, and cooling, the bonding of the adjacent materials or the preferred fibers to one another is substantially complete and causes the decoupler layer to essentially retain the shape of the mold.

Figure 3A:
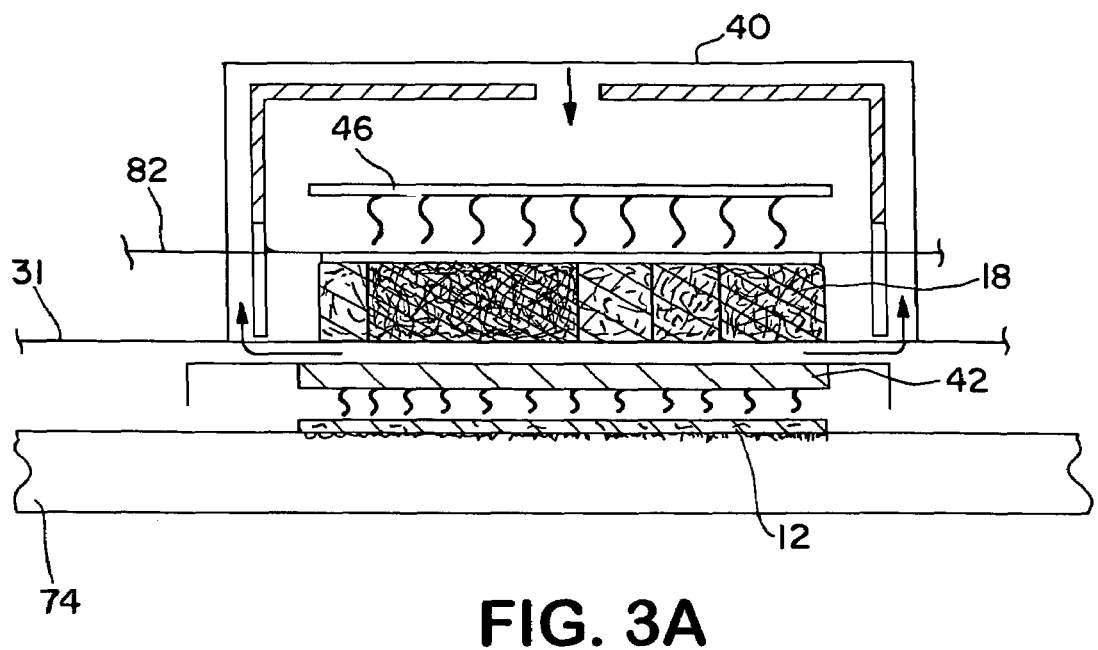
FIG. 3A-3C illustrate alternate heating apparatus for preparing the interior trim component and preform for forming.
Figure 3B:
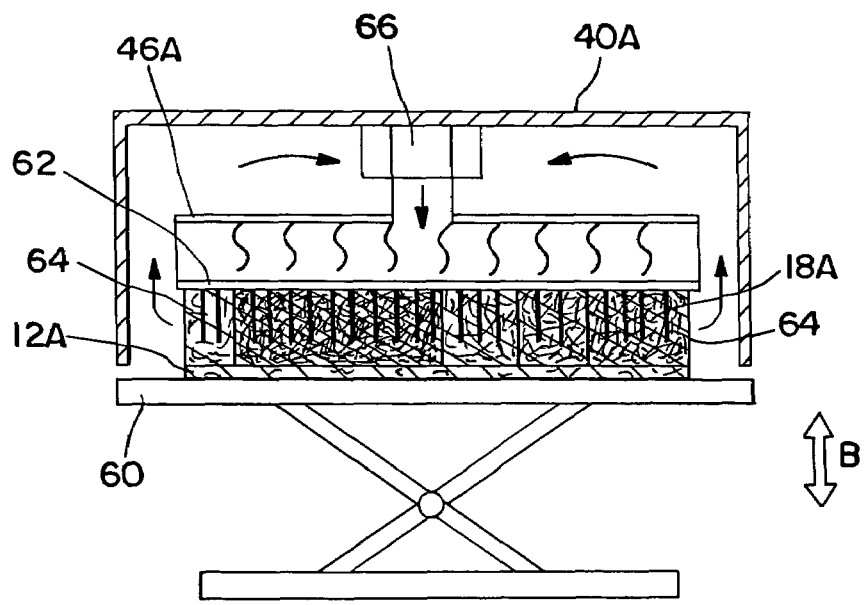
Figure 3C:
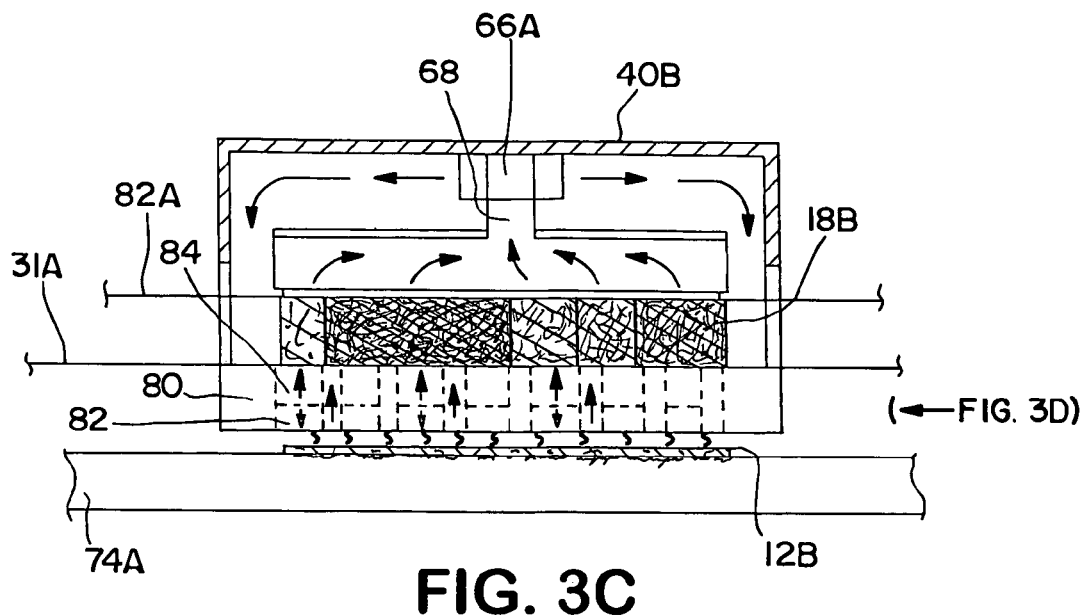

FIGS. 3A-3C describe alternative heating apparatus for carrying out the present invention. A preferred heating means is shown in FIG. 3A in which a hot air circulating oven 40 is disposed over the preform 18 and heated air is circulated through the preform 18 from a source 46 and back into the oven as indicated by the bold arrows. This provides for uniform heating throughout the preform. Preferably, an endless belt 31 may be employed as a carrier for the preform 18 to transport it from the enclosure 30 to the forming mold 50.

(See FIG. 16) Optionally, a second endless belt or conveyor 82 may be used to compress the loose preform slightly and stabilize it while it is being heated. Below the oven 40 for heating the preform 18 is located a second heat source 42, preferably infrared, which is directed at the backside of the interior trim component 18, or carpet for instance in the illustrated case, to separately heat the contacting surface of the carpet to a second temperature. The carpet 12 is conveyed under the heat source preferably by a shuttle conveyor 74. Any sort of heating device 42 may also suffice to provide heat to the backside of the carpet to bind the preform and carpet or interior trim component when they are compressed together and formed to final shape in the mold 50. Alternatively, materials other than an endless belt may be employed as a carrier and provide a specific function to the construction, for instance, the carrier may comprise an acoustic web. Other types of carriers that may be utilized include, but are not limited to, scrim material, skin material, leather, plastic trim pieces, carpeting, shoddy, fiber batting, foam, etc. Preferably, the carrier may be an interior trim component such as carpeting. With respect to the carpeting, such carpeting is preferably porous, and includes a porous backing film, the film comprising a polyolefin polymer, and preferably, a polyethylene based material. In this manner, the preform is built up on the porous film layer of the carpeting. During heating of the preform, the film layer then serves to bond the preform to the carpet material. The carrier layer may further be a disposable layer that is used only for transporting the preform, or may be a functional layer, such as shoddy or acoustical web, that becomes part of the interior trim component construction by being laminated between the preform and the carpeting, for instance, providing even greater improvement in acoustical performance.

FIG. 3B illustrates an alternate embodiment for heating the preform 18 and interior trim component 12 of the present invention. Here, a scissor table 60, or the like, raises the preform 18A and, in this illustration carpet 12A combination, in the upward direction of arrow B to move the combination into the oven 40A. Within the oven 40A is a heat source 46A which provides heated air to a tube sheet 62 which includes a series of holes (not shown) preferably connected to a corresponding series of needles 64 or hollow tubes extending therefrom. When the preform 18A and carpet 12A combination are raised into the oven 40A, the needles 64 penetrate the preform 18A and heated air is forced through the needles 64 via the tubesheet 62, through the preform 18A and against the backside of the carpet 12A, heating both to the desired temperature for forming and bonding. Conversely, the oven 40A may be lowered over the preform 18A and carpet 12A combination. The needles 64 or tubes may extend to different levels within the preform 18A and may alternatively be perforated as well as hollow to improve the uniformity of heating. The heated air exits the preform 18A and is drawn, preferably by suction, as shown by the bold arrows in FIG. 3B through an air circulation device such as a blower 66 and reused. Upon sufficient heating of the material or the preferred fibers and carpet to allow forming and bonding, the preform 18A and carpet 12A combination are lowered out of the oven 40A, as shown by the downward direction of arrow B, and delivered to a mold 50 (See FIG. 16) for forming to final shape. In this manner, a common heating source may be used to heat both the preform 18 internally and the backside of the carpet 12.

Figure 3D:
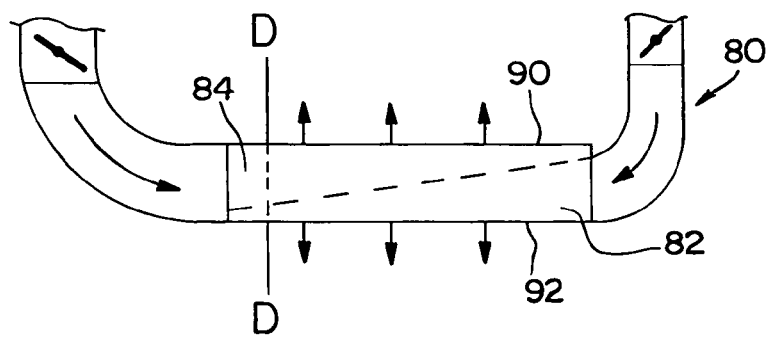
FIG. 3D is a side view of the ducting of FIG. 3C, looking in the direction of movement of the conveyor.

Turning to FIG. 3C, a third embodiment for heating the preform 18B and carpet 12B is shown. In this embodiment, heated air (shown by the bold arrows) is supplied by blower 66A to a series of ducts 80 which the preform passes over on the carrier 31A. The ducting lies between the preform 18B and the interior trim component, such as carpet 12B. The ducts comprise a major duct portion 84 and a minor duct portion 82 which supply a volume of air to the preform 18B and the carpet 12B, respectively. Air flows from the blower 66A through major duct portion 84 which has a perforated top 90 (see FIGS. 3D and 3E), and through the preform 18B. Likewise, air is supplied by blower 66A through minor duct portion 82, which has a perforated bottom 92, to the back surface of carpet 12B. The ducting 80 is shown in FIG. 3D as it extends across the shuttle conveyor 74A, when looking in the direction of movement of that conveyor. Thus, the series of ducts extend across the line and between the preform 18B and carpet 12B to supply heated air to both. The ducts may be configured, as shown by the dashed line in FIG. 3D, to supply a larger volume of air to the major duct portion 84 for heating the preform and a smaller volume of air to the carpet 12B through minor duct portion 82 so that the desired amount of heating of both materials may be accomplished. The flow of the heated air is directed from the blower 66A through the ducts 80, through the preform 18B and against the back surface of the carpet 12B and back to the suction side 68 of the blower 66A.

Figure 3E:
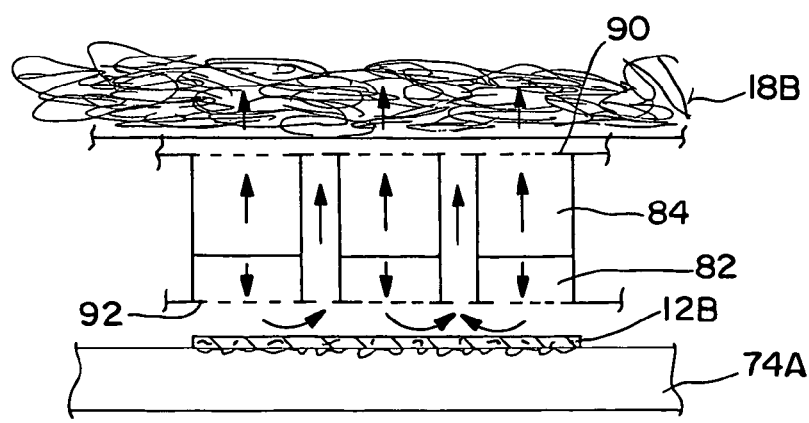
FIG. 3E is an enlarged sectional view of the ducting of FIG. 3C, taken along line D-D of FIG. 3D showing the path of the air flow emanating from the ducting and passing through the preform and against the backside of the interior trim component of the present invention.
Figure 4:
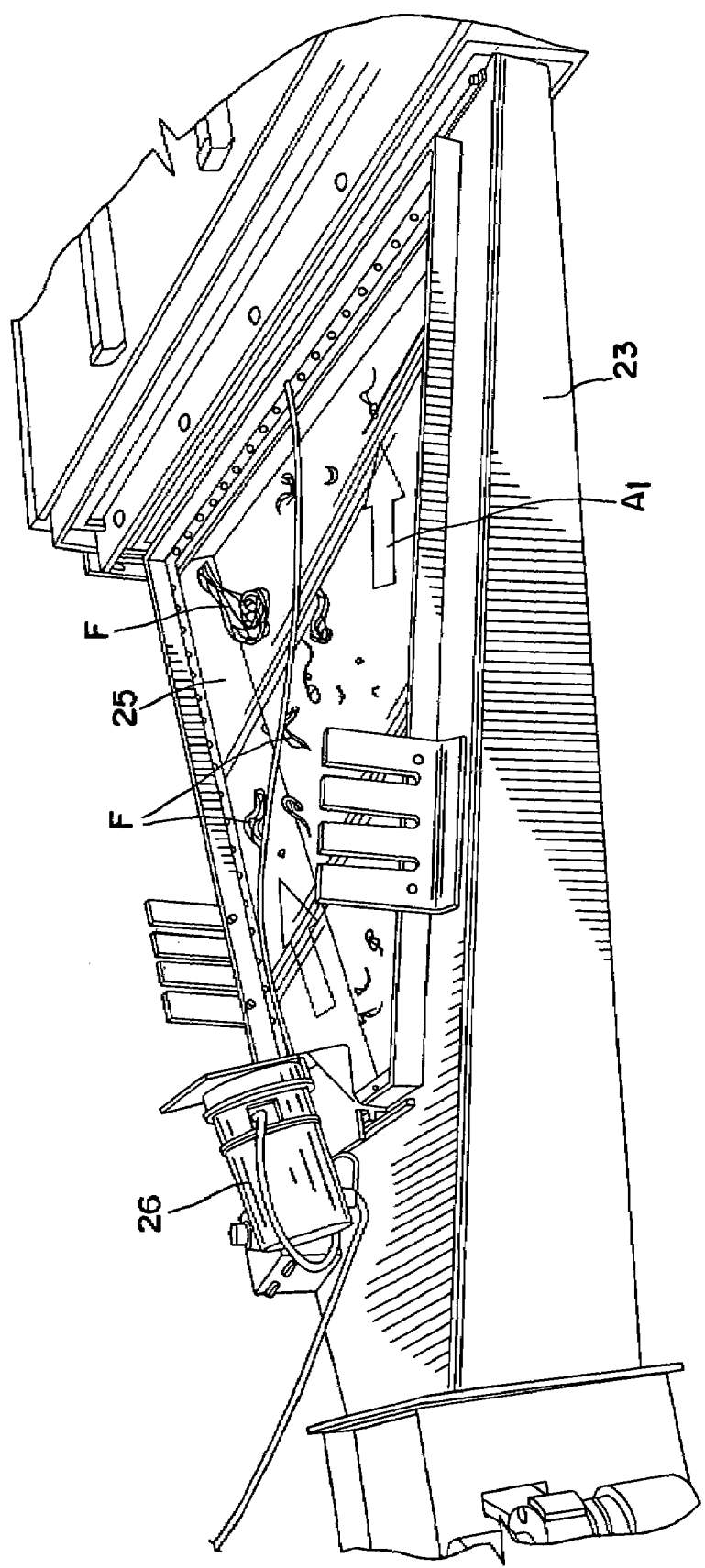
FIG. 4 is a perspective view of the duct that connects the blower and the enclosure of FIG. 2.

FIG. 3E is an enlarged view showing the duct 80 of FIG. 3C in greater detail. Heated air, as shown by the bold arrows, flows out of the major duct portion 84 through the perforated top 90 and penetrates the preform 18B. Heated air also flows out of minor duct 82 through the perforated bottom 92 and against the backside of the carpet 12B. That air is then drawn up between the ducts and back to the blower 66A. In this manner, the preform 18B and the carpet or other interior trim component 12B may be heated with a common heat source and the amount or time of heating controlled by the amount of air supplied to the minor vs. the major duct portions, without the need for a scissors lift as in FIG. 3B. For any of the embodiments shown in FIGS. 3A-3E it should be recognized that the heating may take place by drawing or blowing air or combinations thereof through portions of the preform The process to provide a decoupler layer having areas of different density will now be described. FIG. 4 is a partial perspective view of duct 23. The illustrated duct 23 has a transparent window 29 that allows an operator to view materials or fibers F being blown into the enclosure 30. A pressure gauge 26 is mounted on the illustrated duct 23 and is configured to measure the pressure within the duct 23 and/or within the enclosure.

Figure 5:
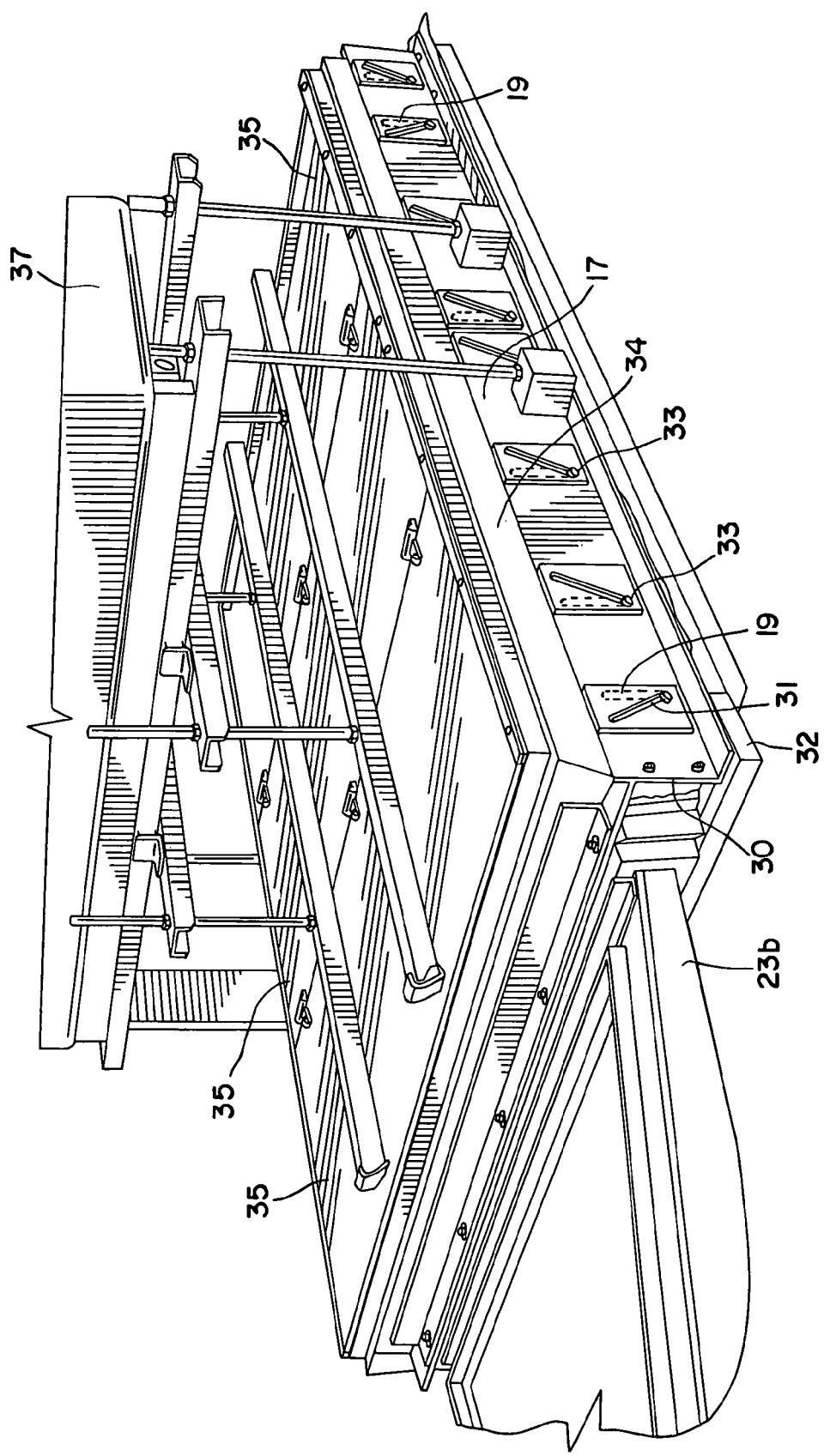
FIG. 5 is a perspective view of the enclosure of FIG. 2 into which fibers are blown to produce a preform, that illustrates the movable panels overlying the perforated portion.

FIG. 5 is a perspective view illustrating the base 32 and movable upper portion 34 in contacting relationship to form enclosure 30. The duct 23 is in fluid communication with the enclosure via duct end 23b. A plurality of movable panels 35 overlie a perforated portion 38 (see FIG. 6) of the enclosure upper portion 34. However, embodiments of the present invention are not limited to a plurality of panels 35. A single panel 35 may also be used. Further, the perforated portion may comprise any portion of the enclosure, top, bottom, side walls, etc., and combinations thereof, to direct material or fiber collection to a specific area where sound attenuation in the finished decoupler is desired. In addition, the height of the enclosure for accommodating the preform may be adjusted by moving upper portion 34 relative to the side walls 17 of the enclosure. Cover plates 31 overlie a slot in the side walls 17 which align with pins 33. The pins can move in the slot 19 to allow the aforementioned enclosure convenient height adjustment.

Figure 6:
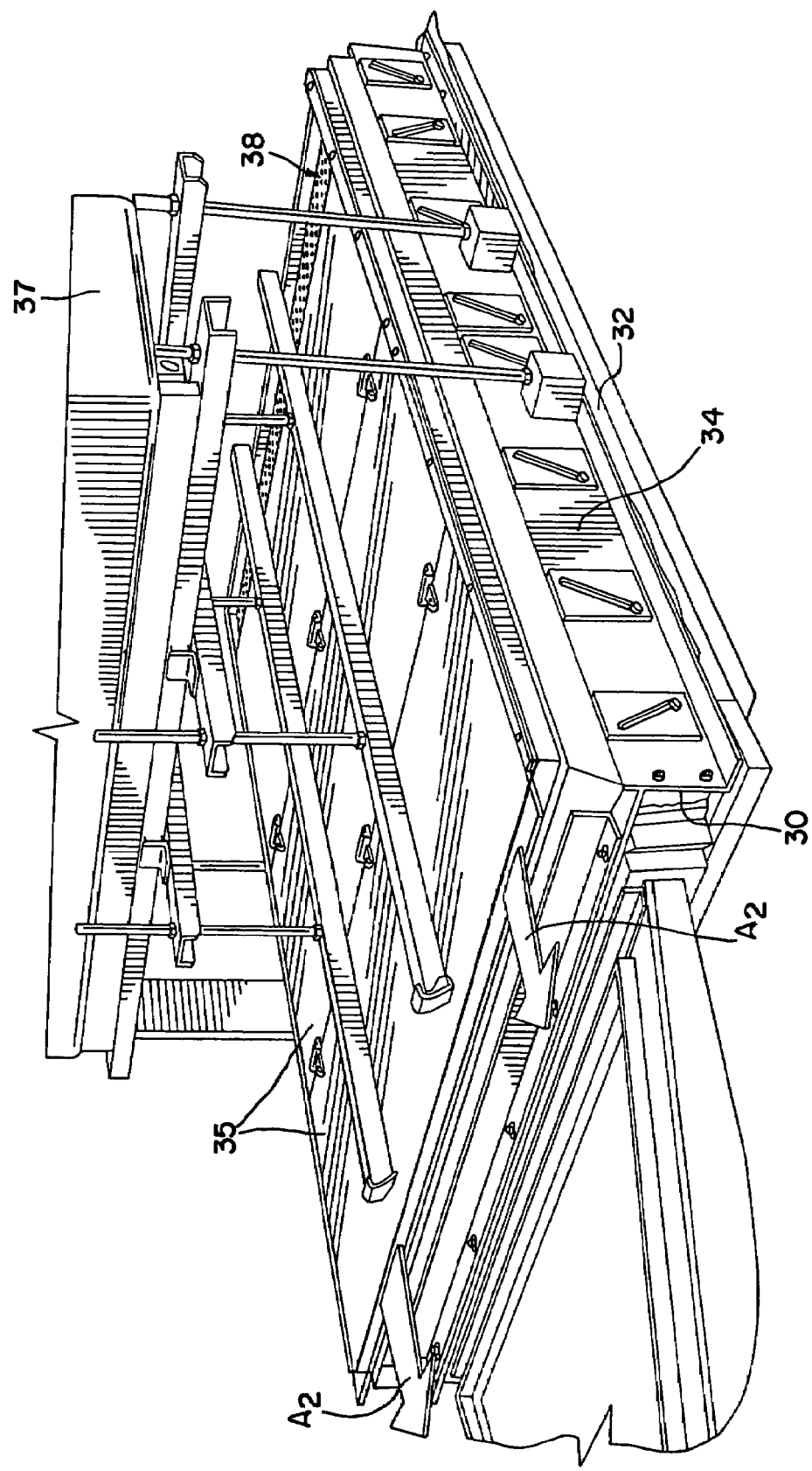
FIGS. 6-7 illustrate the movable panels of FIG. 5 being moved so as to expose the perforated portion.

Operation of the movable panels 35 will now be described with reference to FIGS. 6-7 below. Upper portion 34 of enclosure 30 is configured to be raised and lowered relative to the base 32 via lifting mechanism 37, which is only partially illustrated for clarity, so that the preform 18 may be removed. As illustrated in FIG. 6, the panels may slide to expose the perforated portion 38, allowing more airflow through that area of the enclosure. Alternatively, the panels may be moved in any direction relative to the enclosure rather than in a fore/aft direction. For example, the panels may alternatively be lifted, hinged, rotated or otherwise displaced, to expose selected areas of the perforated portion 38 where greater density is desired. For lower density areas, the panels may be moved more quickly or the perforated portion exposed for a relatively short duration to reduce the collection of material, or fibers, as the case may be, in that area of the preform.

Alternatively, rather than exposing the perforated areas sequentially and continuously, it is contemplated herein that after exposure, selected regions of the perforated portions may be closed. In this manner, one can more reliably develop distinct density boundaries within the decoupler composition. For example, the panels 35 may selectively be opened and closed, across the perforated portion of the enclosure, to selectively collect fibers at such locations. This preferably includes panels that are hinged on one edge which extend over such selected area. The panels can therefore be hingedly moved to expose the perforations, and the time period for opening may be conveniently controlled by an associated processor or programmable logic controller (PLC). The opening and closing may be the same across the entire cross section of the enclosure, or timed differently, to thereby provide different density profiles in the preform.

In FIG. 6, fibers, as the preferred material, are shown being blown into the enclosure 30 and the panels 35 are being moved in the direction of arrows $A_2$ to reveal perforated portion 38. Air blown into the enclosure with the fibers exits the enclosure via perforated portion 38. Fiber density within the enclosure is controlled locally by the rate at which the panels 35 are moved which may be related to the pressure achieved in the air stream as fibers are blown into the enclosure 30 and by the concentration of fibers in the air as it is being conveyed. For greater fiber density in a particular portion of the enclosure, the movement of the panels the panels 35 is slower than for portions of the enclosure where less fiber density is desired. The speed of movement of the panels 35 may be related to the amount of pressure that is created within the enclosure as fibers are blown therein.

Alternatively, it should be recognized that the lower portion of the enclosure 32 may also have a perforated surface which contacts the lower portion of the preform such that one could draw a vacuum or blow air to assist in deposition of the preferred fibers at such locations. For example, in the case of a contoured preform, with areas which are relatively more difficult to fill, the use of vacuum will assist in filling a thick and contoured preform geometry.

Figure 7:
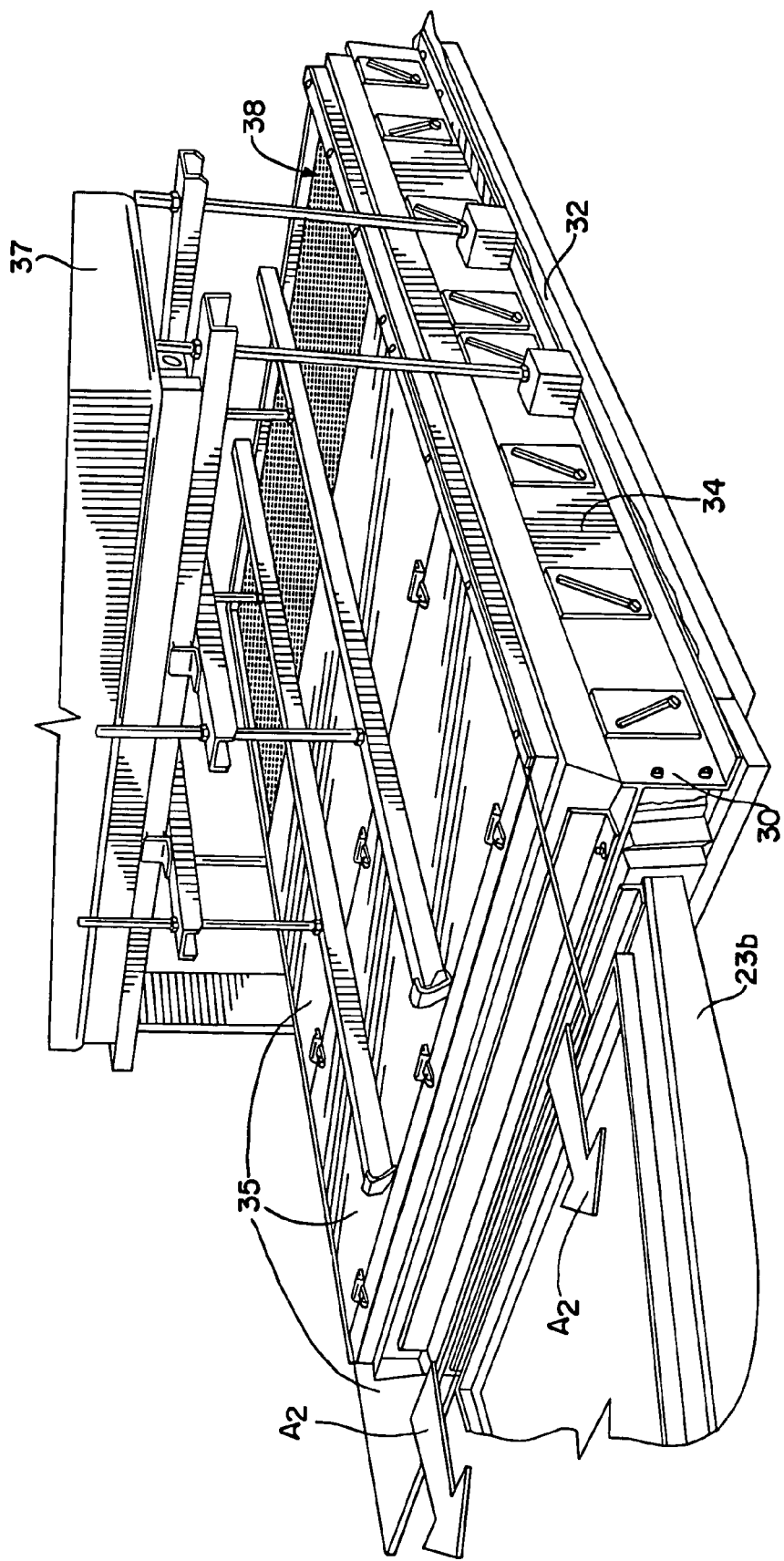

FIG. 7 illustrates panels 35 being moved further along the direction of arrows $A_2$, to reveal more of the perforated portion 38 as the preform is being formed within the enclosure 30. In the illustrated embodiment, the panels 35 are preferably transparent so that operators can observe the forming of the preform within enclosure 30. However, embodiments of the present invention are not limited to transparent panels 35 or even slidable panels at all, as any covering comprising a surface of the enclosure that may be moved in any manner to selectively expose a portion of the perforated portion may suffice.

Figure 8:
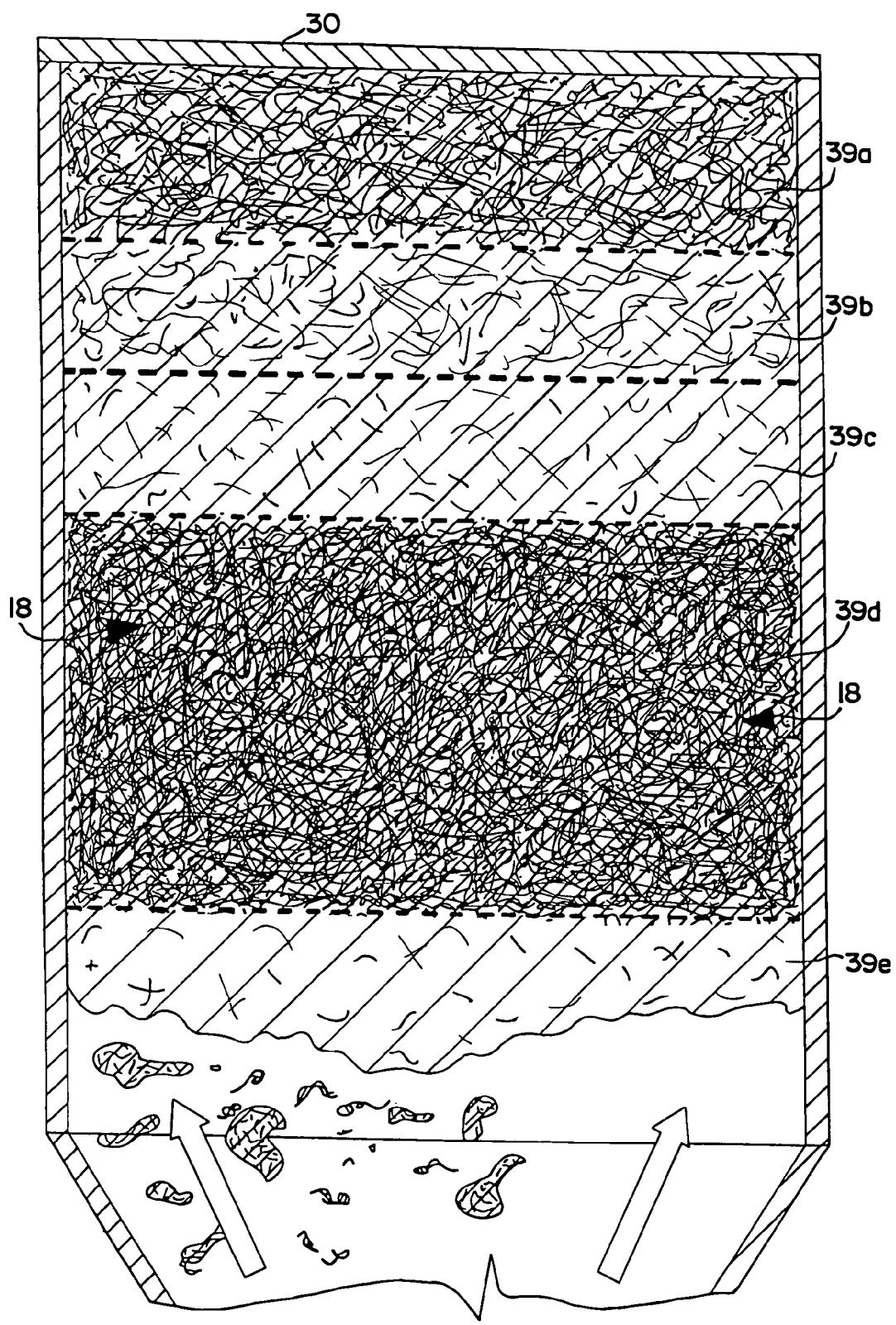
FIG. 8 is a top plan view of the enclosure of FIGS. 5-7 with the upper portion removed for clarity and illustrating a preform substantially formed therein

FIG. 8 is a top plan view of enclosure 30 with the upper portion 34 removed for clarity and illustrating a preform 18 substantially formed therein. The illustrated preform 18 has five portions or sections 39a-39e with respective different fiber densities. Of course, the present invention is not limited to five portions, and may include as many portions as desired by a particular design choice.

As shown, section 39e is still being formed (i.e., fibers as the preferred material are still being blown into the enclosure 30) in FIG. 8. The fiber density of each portion was achieved by controlling the rate of movement of panels 35 at the location of each preform portion as described above. Preferably, each section 39a-39e may be defined by a hinged moveable panel which selectively opens and closes to provide the illustrated density pattern. Alternatively, the hinged moveable panels may be opened and closed for the same approximate duration, so that the density of the preform in each section is approximately the same.

In addition, while illustrated here as being comprised of rectangular areas having different densities, the preform 18 may be formed with selected areas of any desired shape (for instance, round, triangular, hexagonal, etc.) having different densities by configuring the moveable panels 35 to be of a corresponding shape, such that upon movement the airflow emanating from the exposed perforated portion 38 causes more or less material or the preferred fibers to be collected in that particular area.

For example, one may convey the preferred fibers into an enclosure to form a preform having a shape of the enclosure, wherein the enclosure has a panel containing one or a plurality of movable portions relative to the enclosure so as to selectively expose portions of the enclosure. Such movable portion may include, e.g. a plurality of round movable portions (e.g. iris or shutter-like) that selectively open and close across the surface of the panel thereby selectively controlling the air flow. In such opening, preferably, one may include mesh or other related structure to regulate the amount of air that is drawn or blown through, and the amount of material or fiber retained in the enclosure.

Although illustrated herein as a rectangular box-like shape, enclosure 30 may itself have various shapes, sizes and contours which may correspond to one or more preforms or decouplers layers. For instance, a large preform may be formed and cut to shape to provide multiple preforms or a thick preform may be skived to provide two or more thinner preforms. In other words, more than one preform or decoupler layer may be formed in the enclosure at one time. In addition, partitions, such as ribs, baffles and isolated cavities may be included within the enclosure to achieve complex cross-sectional configurations and shapes. For example, each of the illustrated sections 39a-39e of the illustrated decoupler layer 39 (see FIG. 11) could have different cross-sectional dimensions (e.g. different heights, widths and lengths etc.) formed by the outer walls of the enclosure.

Further, in a particularly preferred embodiment, a contoured preform of varied cross-section may be locally reduced in height in the molding process to further densify specific areas of the decoupler layer requiring sound attenuation. This height reduction may vary depending upon the acoustical requirements and density of the decoupler layer at a desired location in the vehicle.

Figure 9:
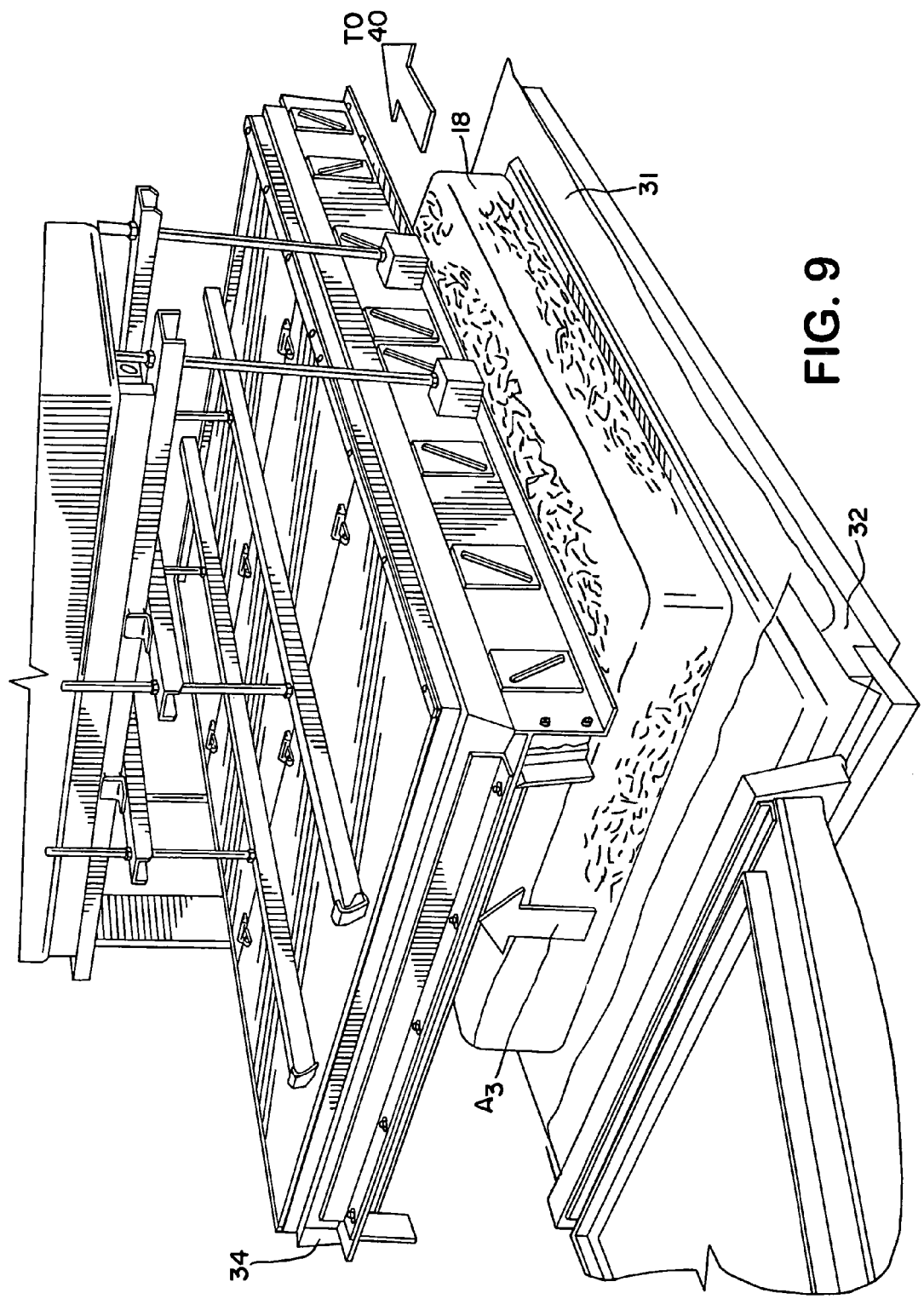
FIG. 9 illustrates the upper portion of the enclosure being moved to expose a preform.

Referring now to FIG. 9, the enclosure upper portion 34 has been moved upwardly as indicated by arrow $A_3$ to reveal the preform 18. As illustrated, the preform 18 is supported by a carrier 31, and is being transported to an oven 40 (FIG. 2) for heating to allow adjacent materials or fibers upon cooling to bond to each other. The carrier may be a sheet of material, an endless belt or may be replaced by a manual operation (i.e., the preform may be carried by hand to another location).

Figure 10:
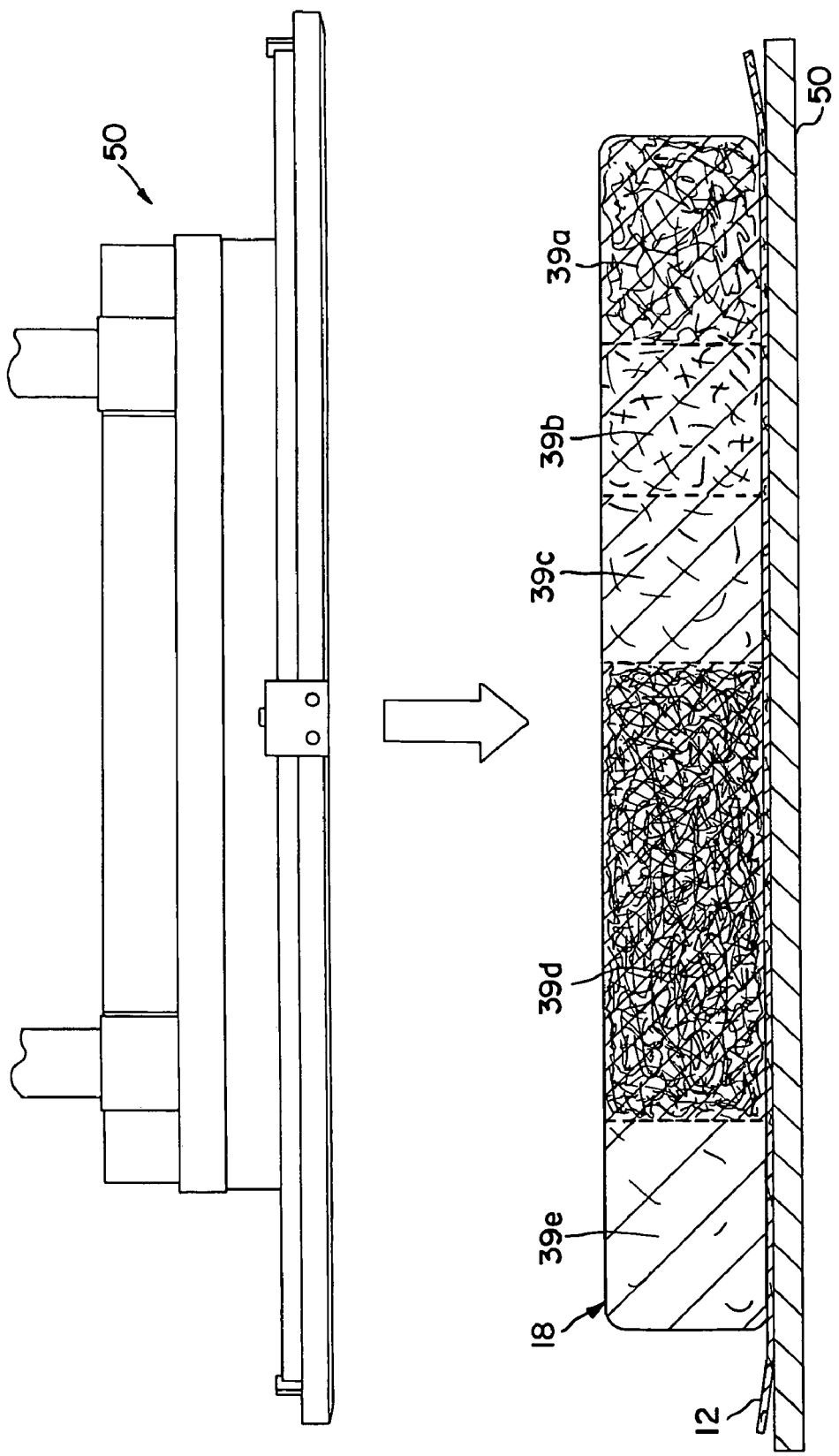
FIGS. 10-15 illustrate various mold configurations for producing interior trim components from preforms into a decoupler layer with different densities (FIGS. 10-11), from contoured preforms into a decoupler layer with different densities (FIGS. 12-13), and from contoured preforms into a decoupler layer with different densities and cross-sectional dimensions (FIGS. 14-15).
Figure 11:
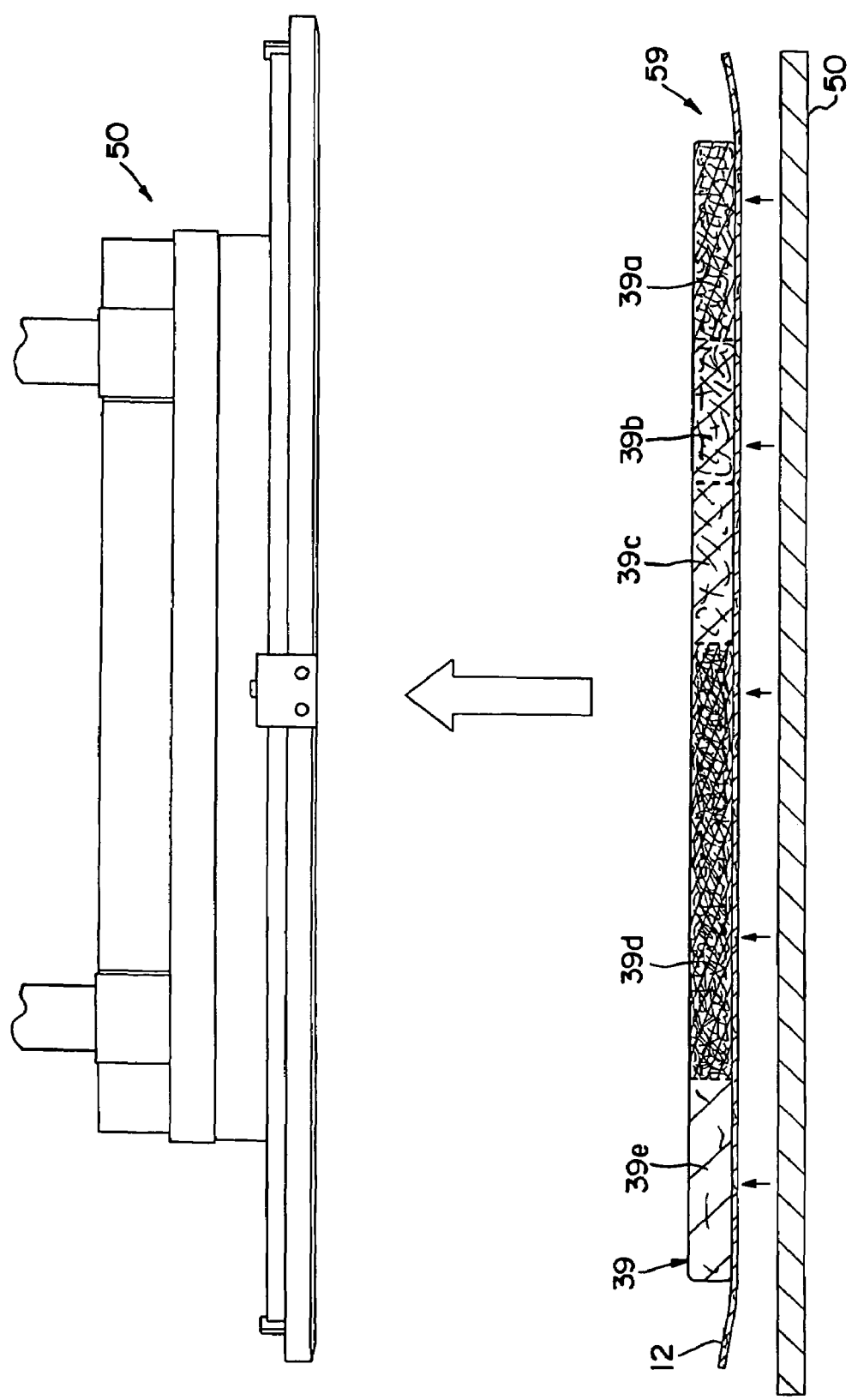

The heated preform 18 is then moved to a mold 50 (FIG. 2) and at about the same time an interior trim component 12 is heated and supplied to the same forming mold 50. The mold 50 is generally comprised of two major components, a cavity portion that forms the outside or visible side of the interior trim component, and a cover portion that forms the backside of the interior trim component. Thus, when a preform 18 and interior trim component 12 are supplied to the mold 50 in a heated state and the mold closed, the preform and component are urged to conform to the shape of the interior of the mold 50, forming an interior trim component including a decoupler layer that is configured to fit a designated area of a vehicle and provide enhanced sound attenuation. For the remainder of this description, the interior trim component 12 will be described as a carpet, although numerous other components that may benefit from improved sound attenuation properties to fulfill their function in a vehicle may also be used, including but not limited to, dash insulators, package shelves, trunk trim, headliners, etc. FIGS. 10-11 illustrate a mold 50 configured to mold the preform 18 and carpet 12 into a substantially rectangular, preferably compressed configuration 59 including a decoupler layer 39. In the illustrated embodiment, sections 39a-39e of decoupler layer 39 have different respective densities, but the same compressed height after molding. Once removed from mold 50 and cooled (see FIG. 11), the molded carpet configuration 59 may be subjected to various trimming and/or other finishing operations known to those skilled in the art.

Figure 12:
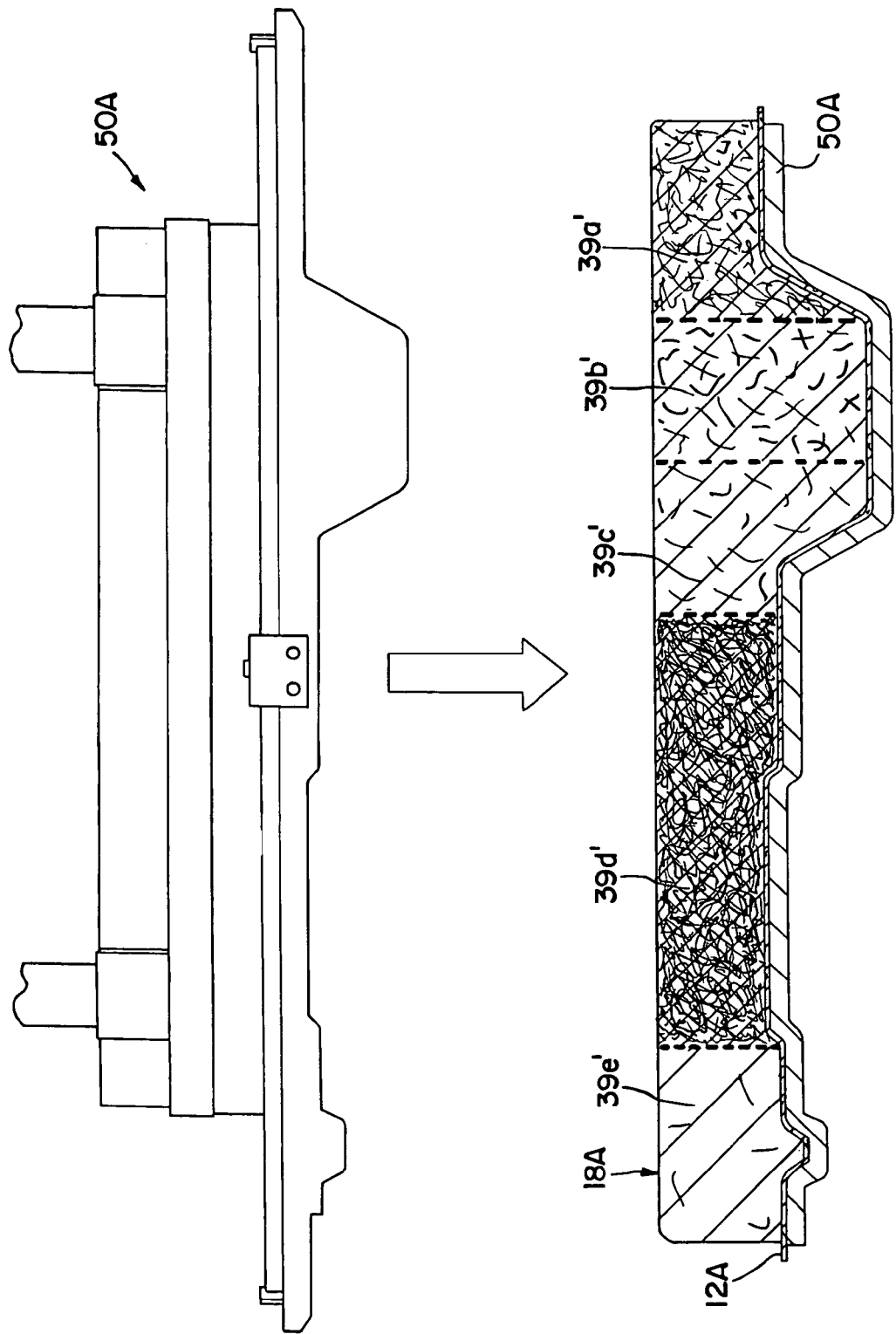
Figure 13:
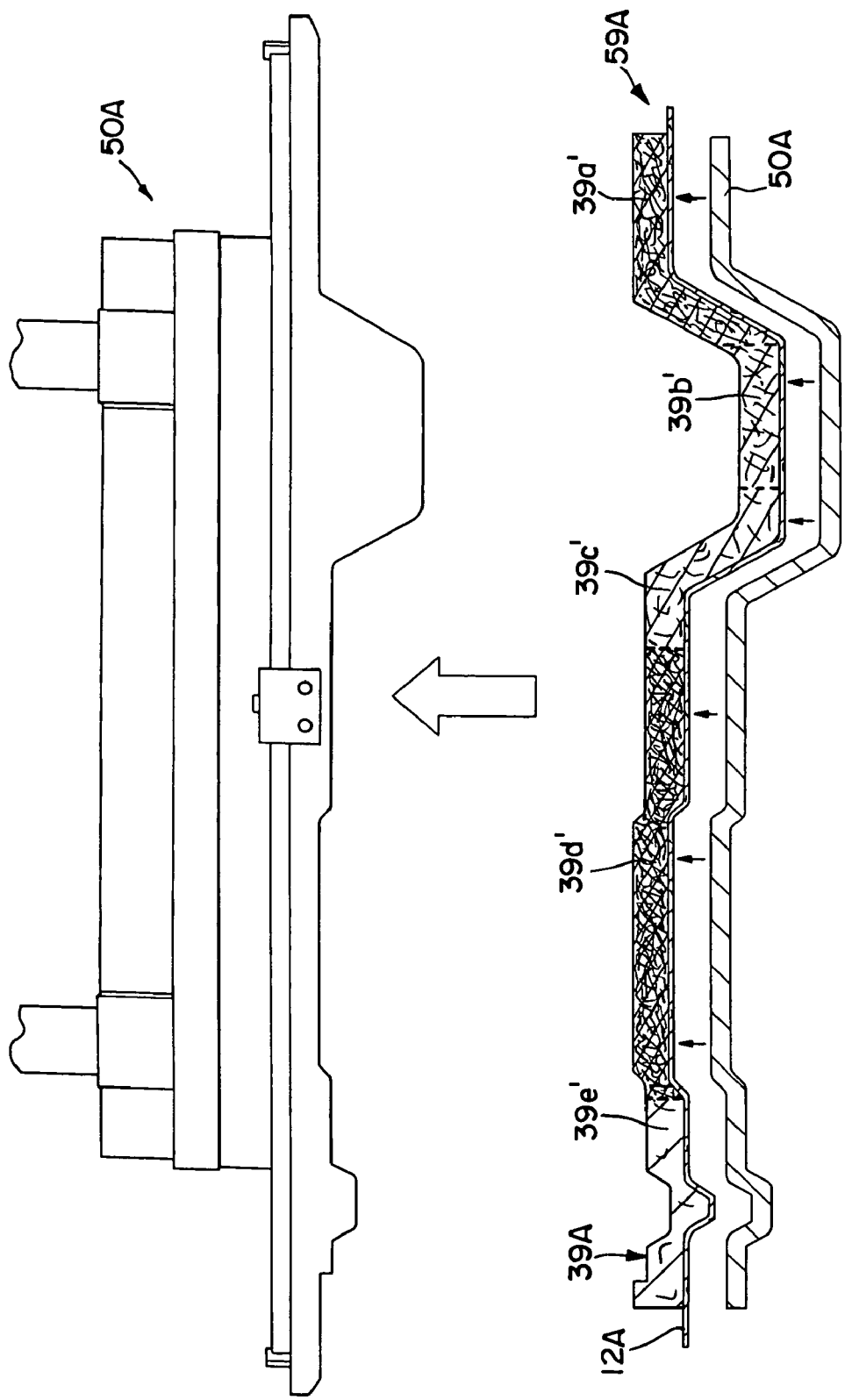

FIGS. 12-13 illustrate a mold 50A configured to mold a preform 18A having a substantially contoured configuration (FIG. 12) into a compressed decoupler configuration 39A and carpet 12A with a substantially constant cross-sectional dimension (FIG. 13) to form a carpeted decoupler 59A. In the illustrated embodiment of FIGS. 12-13, the decoupler layer 39A has a contoured configuration but sections 39a'-39e' have different respective densities and the same height after molding.

Figure 14:
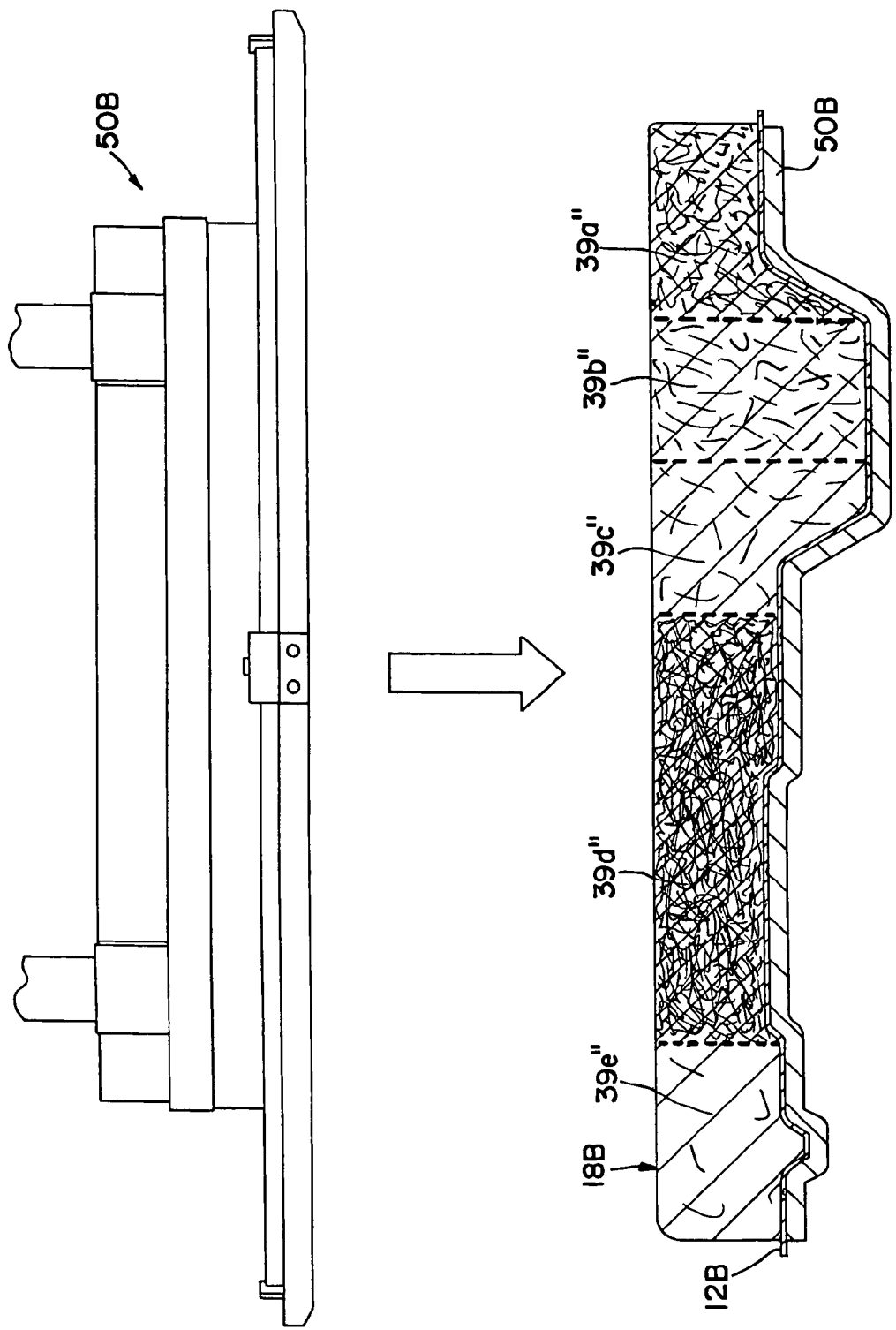
Figure 15:
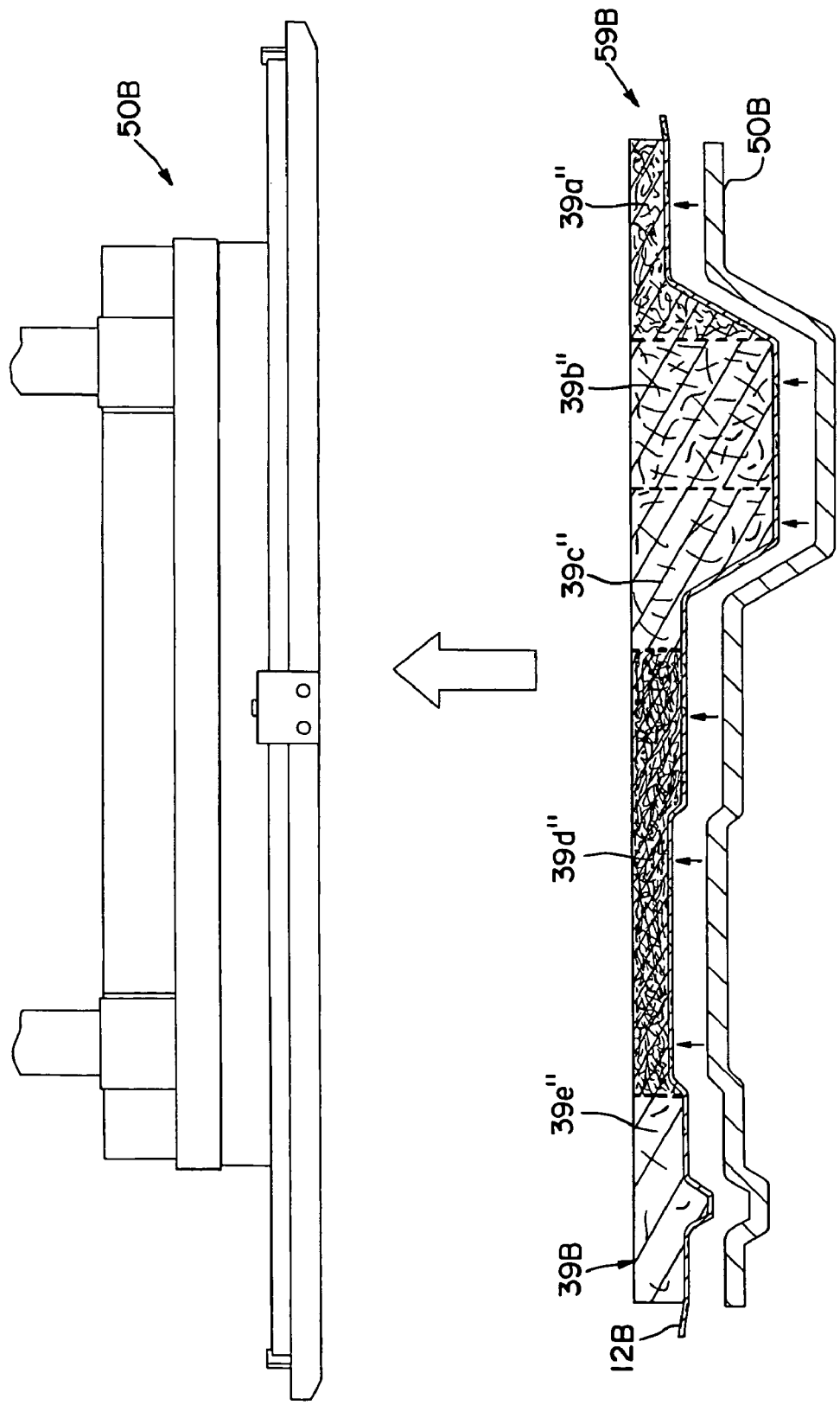

FIGS. 14-15 illustrate a mold 50B configured to mold a preform 18B (FIG. 14) having a partially contoured configuration and carpet 12B into a compressed configuration 39B with non-constant cross-sectional dimensions (FIG. 15) to form a carpeted decoupler 59B. In the illustrated embodiment of FIGS. 14-15, the decoupler layer 39B has a contoured configuration but sections 39a"-39e" have different respective densities and different respective heights after molding to provide a wide range of acoustic impedance.

Figure 16:
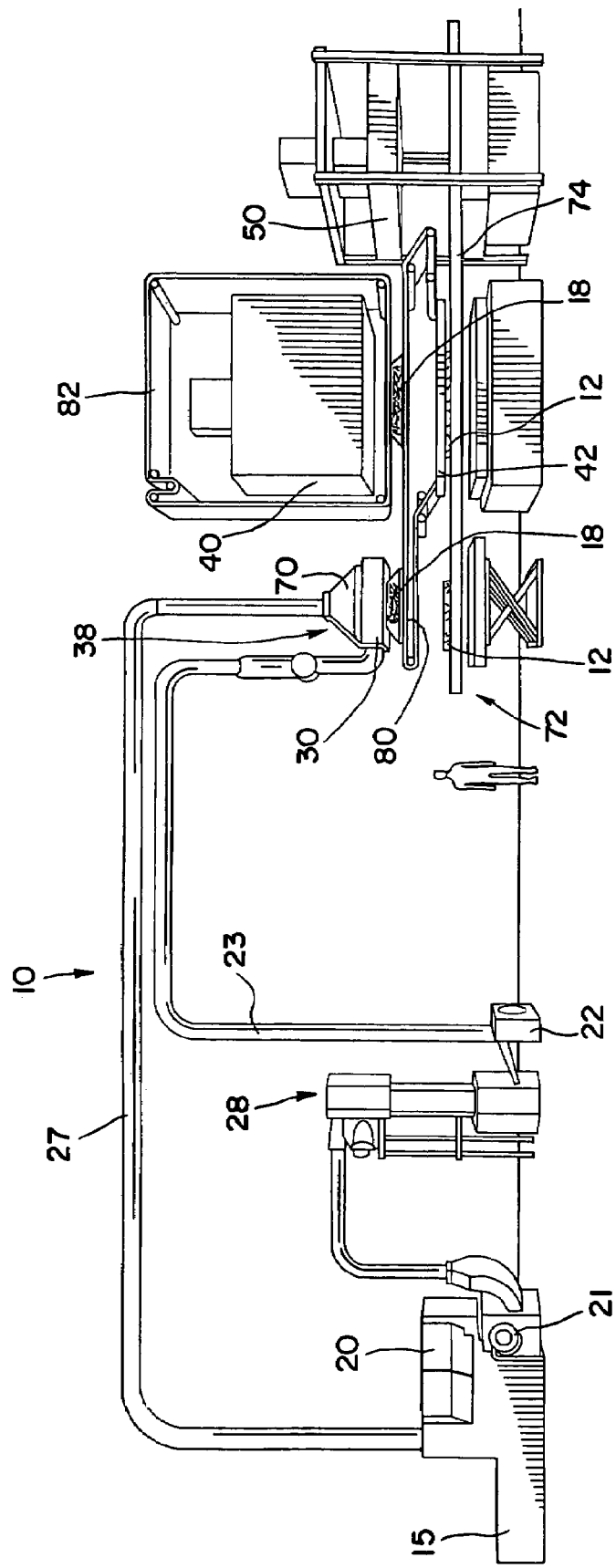
FIG. 16 is a schematic illustration of a system for mass-producing interior trim components including a decoupler layer, according to embodiments of the present invention.

FIG. 16 is a schematic illustration of a preferred assembly line system 10 for mass-producing decouplers for vehicle interior trim components, according to embodiments of the present invention. The illustrated system 10 functions similarly to system 10 of FIG. 2. Preferably, fiber bales are broken apart and opened via bale breaker/fiber opener 15, 20. A fan 21 supplies the loose fibers to blower 22 via accumulator 28. A blower 22 feeds the open fibers into an enclosure 30 via duct 23. A vacuum hood 70 positioned above enclosure 30 removes airborne fibers that emanate from the perforated portion 38 of the enclosure 30 and returns them for reuse via duct 27 to the opening station 20. An endless conveyor system 80 serves as a carrier for each preform 18 formed within the enclosure 30. A second endless belt 82 preferably encircles a portion of the oven 40 and serves to compress the loose preform slightly so that heated air may be blown through the preform to heat it. A section of carpet 12 is shown at the load station 72 of a shuttle conveyor 74 which moves the carpet from the load station 72 to a position under an infrared heater 42. The conveyors 80, 74 transport each preform 18 and carpet section 12, respectively, to the mold 50 to form a decoupler layer 39 combined with an interior trim component 59. The shuttle conveyor 74 may include pins that penetrate the carpet along each side and serve to keep the carpet taut and to time the arrival of the carpet 12 to match that of the preform 18 at the mold 50 so that the two materials may be aligned for forming into the finished trim panel configuration 59.

In a particularly preferred embodiment, a carpet section may be used as the carrier for forming the preform so that the carpet and preform may be heated together in an oven and the heated combination transferred to a forming mold which forms the combination into a three dimensional configuration in a minimal number of operations.

Figure 17:
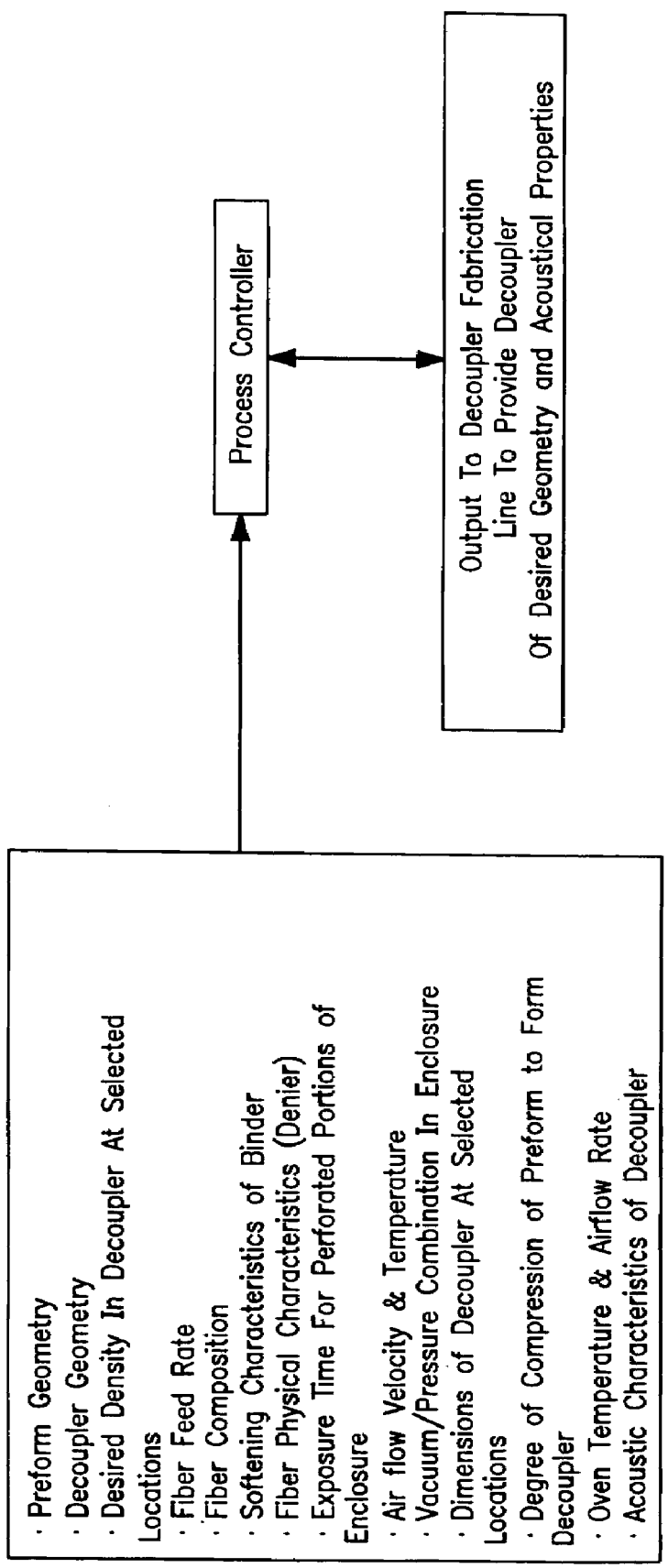
FIG. 17 is a schematic diagram of the operation of a process controller used in the system of FIG. 16.

FIG. 17 illustrates that the present invention may be automated through a process controller (computer) which has inputs of the indicated variables, such as preform geometry, decoupler layer geometry, desired density in the decoupler layer at selected locations, material or fiber feed rate, material or fiber composition, softening characteristics of the binder, fiber denier, exposure time for perforated portions of the enclosure, air flow velocity and temperature, vacuum/pressure combination in the enclosure, dimensions of the decoupler layer at selected locations, degree of compression of the preform to form the decoupler layer, oven temperature and air flow rate and the desired acoustic characteristics of the decoupler layer, etc. The inputting of this information is then evaluated and outputted to the decoupler layer fabrication line to provide a preform and/or decoupler layer of a desired density, geometry and/or acoustical properties.

Figure 18:
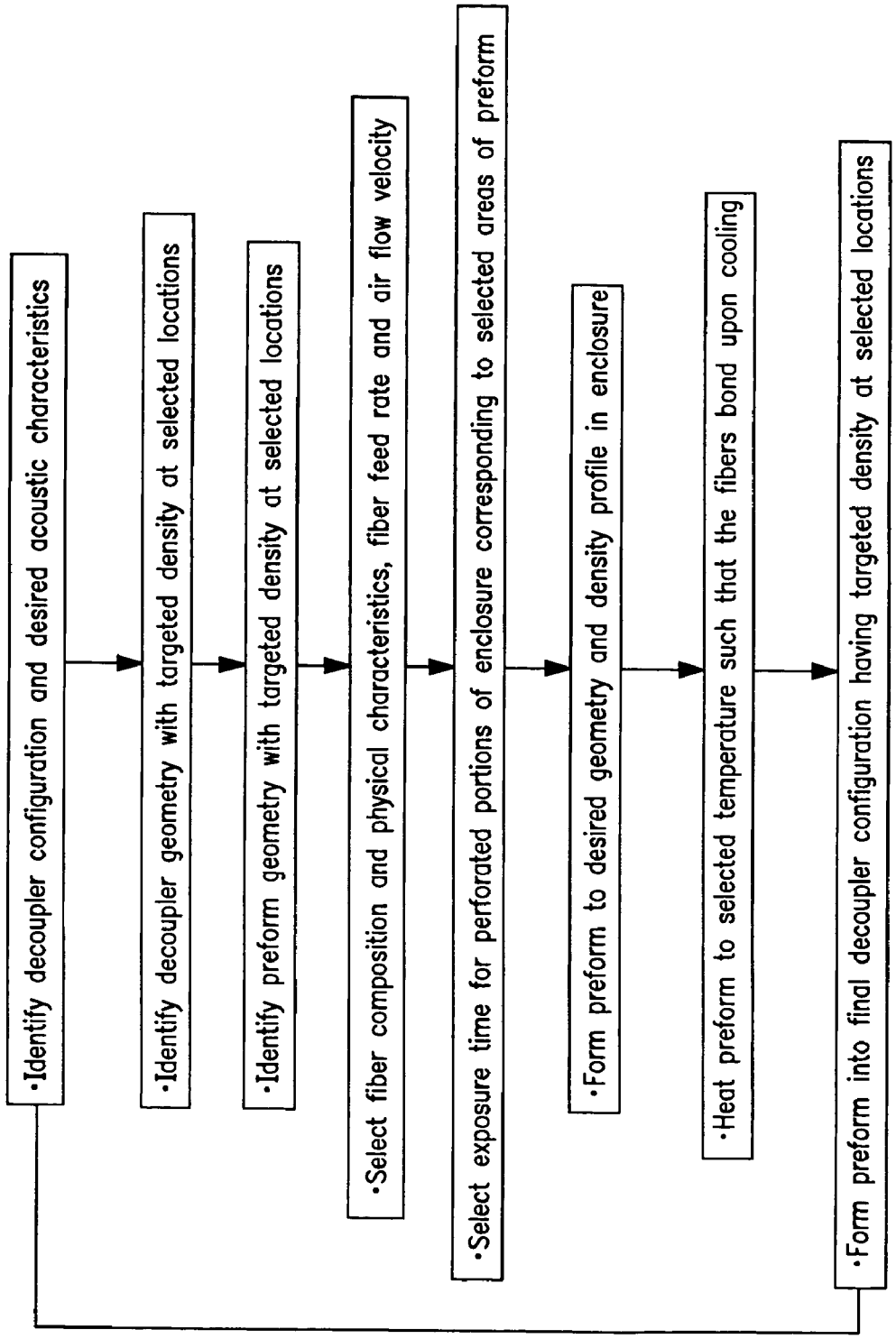
FIG. 18 is a flow chart describing the flow of information managed by the process controller of FIG. 17.

FIG. 18 illustrates in exemplary embodiment the process control features which may take place using the process controller of the present invention. For example, one may identify an interior trim component configuration, including a decoupler layer, with desired acoustic characteristics at selected locations. The processor then compares this input with information stored in a machine readable memory which identifies a density and thickness that corresponds to the desired acoustic characteristics at such selected locations. The controller then determines a suitable preform geometry with density requirements at the selected location to achieve the decoupler layer acoustic requirements. The processor then selects the appropriate process inputs of the system to create such preform that provides the desired decoupler layer. This includes selecting material or fiber composition and physical characteristics (e.g., denier) and material or fiber feed rate and air flow velocity to deliver to the system enclosure. In addition, the processor may select and control the exposure time for perforated portions of the enclosure corresponding to the areas of the preform that must be formed with a selected density. The processor then selects and controls the formation of the preform including the density profile of the preform that is desired. The processor also then selects and controls the temperature of the oven that heats the preform and carpet, or other interior trim component, to a selected temperature such that the fibers bond upon cooling. The processor selects and controls the time and pressure in the mold that is utilized to form the preform into the final interior trim component including a decoupler layer.

Accordingly, in connection with the above, the present invention also contemplates a machine-readable medium whose contents cause a system to perform a method of forming a decoupler layer for a vehicle interior trim component. The medium acts to store desired acoustical characteristics of an interior trim product configuration including a decoupler layer in the medium and to store processing variables required to provide acoustical characteristics of a decoupler layer. The medium then selects certain processing variables required to form the decoupler layer with the desired acoustical characteristics. The medium then outputs the processing variables to the system to perform the method of forming the interior trim component including a decoupler layer.

It will be appreciated that the functionality described for the embodiments of the invention may be implemented by using hardware, software or combination of hardware and software. If implemented by software, a processor and machine-readable medium are required. The processor may be of any type of processor capable of providing the speed and functionality required by the embodiments of the invention. For example, the processor could be a processor from the Pentium® family of processors made by Intel Corporation, or the family of processors made by Motorola. Machine-readable media include any media capable of storing instructions adapted to be executed by a processor. Some examples of such media include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. In one embodiment, the instructions are stored on the medium in a compressed and/or encrypted format.

In one non-limiting example, a bale of fibers comprising 45% (wt) of a bicomponent sheath/core fiber composition was utilized, wherein the sheath comprised an amorphous polyester with Tg of about 70° C. with an inner core of crystalline PET with a Tm of about 220° C. Such bicomponent was mixed with 55% (wt) of a cotton/polyester blend, wherein the polyester comprised recycled polyester fibers. The bales were broken into loose fibers and the fibers supplied via an air stream to an accumulator which provided temporary storage of the fibers for feeding into the enclosure for forming the preform. The fibers were then introduced into the enclosure at a rate of about 20 lbs/minute for a duration of about 35 seconds. A series of hinged panels were sequentially opened and closed to expose perforated areas of the enclosure as the fibers were introduced. This provided a preform having dimensions of about 8 feet long by 6 feet wide by 8 inches thick, having a basis weight of about 133 g/ft$^2$. The preform was transferred onto a section of porous carpeting including a porous backing film, the film comprising a polyethylene based material disposed against the preform. The combination of preform and carpet was heated by an oven which was supplied with hot air at a temperature of about 340° F., blown upwardly through the porous carpet and into the preform for about 95 seconds. The heated preform was compressed about 40-60% while in the oven. In this manner, the preform was built up on the porous film layer of the carpeting. The heated combination was then transferred to a forming mold and pressed into the desired shape, wherein the preform was further densified within its cross-section to provide the desired acoustic characteristics.

The system of the present invention provides articles such as trim components for sound attenuation that include a decoupler layer which is low in weight, may have a thickness ranging from about 4 mm to 50 mm or more, may have a wide range of areal densities, for instance from 700 grams per square meter or less to 1800 grams per square meter or greater, provides an excellent balance between sound absorption and sound transmission loss and may be combined with a wide variety of cover materials, including trim components, and heavy or light porous or non-porous layers. In addition, all incremental values for said thickness and areal densities are contemplated. More importantly, the sound attenuation properties of the decoupler layer may be tailored locally by varying the density and/or the cross-sectional thickness in different areas to provide a solution heretofore not available.

Thus the invention provides a means to manufacture articles of controlled density such as, acoustic decouplers combined into interior trim components for use in motor vehicles, which are formed into complex configurations and provide different levels of sound attenuation in various areas of the component by varying both the density and the cross-sectional thickness of the decoupler layer. Further, the decoupler layer is attached to a trim component as part of the molding process to provide a finished product ready for installation in the vehicle, having a configuration matching an area which requires specific sound attenuation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of manufacturing a vehicle interior trim component including a decoupler layer, comprising:
    conveying materials into an enclosure to form a preform having a shape of said enclosure, and having a density, wherein said enclosure has a perforated portion and at least one panel movable relative to said enclosure so as to selectively expose portions of said perforated portion, wherein said density of said preform may be varied as said at least one panel is moved to expose said perforated portion of said enclosure;
    heating said preform to a first temperature such that said materials bond to one another upon cooling;
    heating a vehicle interior trim component to a second temperature;
    mating said heated preform to said heated vehicle interior trim component; and
    forming said mated preform and vehicle interior trim component into a predetermined three-dimensional interior trim product configuration including said decoupler layer via a mold.

2. The method of claim 1, wherein said vehicle interior trim component comprises carpeting.

3. The method of claim 1, wherein said vehicle interior trim component comprises a dash insulator.

4. The method of claim 1, wherein said vehicle interior trim component comprises trunk trim.

5. The method of claim 1, wherein said vehicle interior trim component comprises a headliner.

6. The method of claim 1, wherein said enclosure has a contoured shape.

7. The method of claim 1 wherein said materials comprise thermoplastic material, thermoset material, fibrous material, foam, woven material, nonwoven material, fibers of any type, and combinations thereof.

8. The method of claim 7, wherein said fibers may comprise any of natural fibers, synthetic fibers, recycled fibers, bicomponent fibers and blends thereof.

9. The method of claim 8, wherein said fibers comprise shoddy fibers.

10. The method of claim 1, wherein said materials are conveyed into the enclosure in a substantially loose state.

11. The method of claim 1, wherein a carrier layer is disposed within the enclosure and wherein the preform is supported by the carrier layer.

12. The method of claim 11, wherein said carrier layer comprises an acoustic web of material, shoddy or cover layer for a trim component.

13. The method of claim 11, wherein said carrier layer comprises scrim material.

14. The method of claim 11, wherein said carrier layer comprises an endless belt.

15. The method of claim 1, wherein said materials are conveyed into the enclosure from more than one direction.

16. The method of claim 1, wherein said materials are conveyed into said enclosure so as to form said preform having first and second portions having different respective densities.

17. The method of claim 16, wherein said materials are conveyed into said enclosure so as to form said preform having said first and second portions having different cross-sectional dimensions, and wherein said forming step comprises forming said heated preform and said interior trim component into said predetermined three-dimensional interior trim product configuration having a decoupler layer.

18. The method of claim 16, wherein the fibers are conveyed into the enclosure so as to form a preform having first and second portions having the same cross-sectional dimensions, and wherein the forming step comprises forming the heated preform and said interior trim component into a predetermined three-dimensional interior trim product configuration having a decoupler layer.

19. The method of claim 1, wherein said conveying materials into said enclosure includes the adjusting of the rate of movement of said at least one panel to adjust said density in identified portions of said decoupler layer requiring enhanced sound attenuation.

20. The method of claim 1, further comprising the ascertaining of acoustic properties of a vehicle passenger compartment to identify portions of said decoupler layer requiring enhanced sound attenuation.

21. The method of claim 20, wherein said ascertaining of acoustic properties of the vehicle passenger compartment comprises identifying portions of said decoupler layer at which sound within a predetermined frequency range is directed at an intensity level that exceeds a threshold intensity level.

22. The method of claim 1 wherein said materials are heated as they are conveyed into said enclosure.

23. The method of claim 1 including a plurality of panels movable relative to the enclosure.

24. The method of claim 23 wherein said panels are hingedly moveable and selectively opened and closed.

25. The method of claim 1 wherein said enclosure includes a partition.

26. The method of claim 1 wherein the density of the preform may be varied as the at least one panel is moved to expose the perforated portion of the enclosure.

27. The method of claim 1 wherein the step of heating the preform to a temperature such that said materials may bond to one another upon cooling comprises supplying said materials comprising an amorphous polymer and a crystalline polymer wherein said amorphous polymer is heated above its glass transition temperature (Tg) and said crystalline polymer is heated to a temperature below its melting point (Tm).

28. A method of manufacturing a vehicle interior trim component including a decoupler layer, comprising:
- conveying materials into an enclosure to form a preform having a shape of said enclosure and having a density, wherein said enclosure has a panel containing one or a plurality of movable portions relative to said enclosure so as to selectively expose portions of said enclosure, wherein said density of said preform may be varied as said one or a plurality of movable portions are moved to expose a portion of said enclosure;
- heating said preform to a temperature such that said materials may bond to one another upon cooling;
- heating a vehicle interior trim component to a second temperature;
- mating said heated preform to said heated vehicle interior trim component; and
- forming said mated preform and vehicle interior trim component into a predetermined three-dimensional interior trim product configuration including said decoupler layer via a mold.

29. The method of claim 28 wherein said step of conveying materials includes introducing said materials in a substantially loose state by blowing said materials into said enclosure with an air stream, and said one or a plurality of moveable portions upon moving defines an opening in said panel to expose a portion of the enclosure, wherein said openings further include a structure to regulate the amount of air that blows through and the amount of material retained in the enclosure.

30. The method of claim 29 wherein vacuum is included to convey said materials into said enclosure to form said preform.

31. The method of claim 29 wherein said step of conveying materials includes introducing said materials in a substantially loose state by blowing said materials into said enclosure with an air stream and applying a vacuum to convey said materials.

32. The method of claim 29 wherein said materials comprise thermoplastic material, thermoset material, fibrous material, foam, woven material, nonwoven material, fibers of any type, and combinations thereof.

33. A method of manufacturing an article having a controlled density, comprising:
- conveying materials into an enclosure to form a preform having a shape of said enclosure and having a density, wherein said enclosure has a perforated portion and at least one panel movable relative to said enclosure so as to selectively expose portions of said perforated portion; and
- heating said preform to a temperature such that said materials may bond to one another upon cooling,
- supplying a vehicle interior trim component and heating said vehicle interior trim component to a second temperature;
- mating said heated preform to said heated vehicle interior trim component; and
- forming said mated preform and vehicle interior trim component into a predetermined three-dimensional interior trim product configuration including said decoupler layer via a mold.

* * * * *